US012809190B2

(12) United States Patent
Park

(10) Patent No.: US 12,809,190 B2
(45) Date of Patent: Nov. 24, 2026

(54) CAMERA DEVICE AND OPTICAL INSTRUMENT

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 455 days.

(21) Appl. No.: 18/026,298

(22) PCT Filed: Aug. 24, 2021

(86) PCT No.: PCT/KR2021/011309

§ 371 (c)(1),
(2) Date: Mar. 14, 2023

(87) PCT Pub. No.: WO2022/059949

PCT Pub. Date: Mar. 24, 2022

(65) Prior Publication Data

US 2023/0367135 A1 Nov. 16, 2023

(30) Foreign Application Priority Data

Sep. 16, 2020 (KR) ........................ 10-2020-0118965

(51) Int. Cl.
*G02B 27/64* (2006.01)
*G02B 7/18* (2021.01)
*G03B 5/00* (2021.01)

(52) U.S. Cl.
CPC ............. *G02B 27/646* (2013.01); *G02B 7/18* (2013.01); *G03B 5/00* (2013.01); *G03B 2205/0023* (2013.01); *G03B 2205/0069* (2013.01)

(58) Field of Classification Search
CPC .. G03B 5/00; G03B 13/36; G03B 2205/0007; G03B 2205/0046; G03B 2205/0069; G03B 2205/0023; G03B 3/10; G03B 30/00; H02K 11/215; H02K 41/0354; H04N 23/51; H04N 23/57; H04N 23/58; H04N 23/55; H04N 23/687
(Continued)

(56) References Cited

U.S. PATENT DOCUMENTS

2011/0176046 A1* 7/2011 Hu ......................... H04N 23/68 348/335
2017/0139225 A1* 5/2017 Lim ..................... G02B 27/646
(Continued)

FOREIGN PATENT DOCUMENTS

CN 210986196 U 7/2020
JP 2007-178914 A 7/2007
(Continued)

*Primary Examiner* — Marin Pichler
(74) *Attorney, Agent, or Firm* — Birch, Stewart, Kolasch & Birch, LLP

(57) ABSTRACT

The present embodiment relates to a camera device, comprising: a housing; a mover disposed within the housing; a first magnet and coil tiling the mover relative to a first axis; a second magnet and coil tiling the mover relative to a second axis, which is perpendicular to the first axis; and a lens module moving along a third axis, which is perpendicular to the first and second axes, wherein the light enters along the first axis, and a first yoke is disposed between the second magnet and the mover.

20 Claims, 21 Drawing Sheets

(58) Field of Classification Search
USPC ........... 359/822, 823, 824, 694, 813; 396/89
See application file for complete search history.

(56) References Cited

U.S. PATENT DOCUMENTS

| | | | | |
|---|---|---|---|---|
| 2018/0367714 | A1* | 12/2018 | Im ........................ | H04N 23/687 |
| 2019/0230255 | A1 | 7/2019 | Fu et al. | |
| 2019/0285907 | A1 | 9/2019 | Kang et al. | |
| 2020/0225442 | A1* | 7/2020 | Weng ..................... | H04N 23/54 |
| 2020/0409033 | A1 | 12/2020 | Lee et al. | |
| 2021/0377447 | A1* | 12/2021 | Jeong ....................... | G03B 3/10 |

FOREIGN PATENT DOCUMENTS

| | | | | | |
|---|---|---|---|---|---|
| JP | 2017-90887 | A | | 5/2017 | |
| JP | 6613005 | B1 | | 11/2019 | |
| KR | 10-2007-0007711 | A | | 1/2007 | |
| KR | 10-2018-0120894 | A | | 11/2018 | |
| KR | 10-2018-0137278 | A | | 12/2018 | |
| KR | 10-2067069 | B1 | | 1/2020 | |
| KR | 10-2020-0039378 | A | | 4/2020 | |
| KR | 10-2100195 | B1 | | 4/2020 | |
| KR | 10-2131597 | B1 | | 8/2020 | |
| WO | WO 2018/151388 | A1 | | 8/2018 | |
| WO | WO-2020071852 | A1 | * | 4/2020 | ............... G03B 5/00 |

* cited by examiner

CAMERA DEVICE AND OPTICAL INSTRUMENT

CROSS REFERENCE TO RELATED APPLICATIONS

This application is the National Phase of PCT International Application No. PCT/KR2021/011309, filed on Aug. 24, 2021, which claims priority under 35 U.S.C. 119(a) to Patent Application No. 10-2020-0118965, filed in the Republic of Korea on Sep. 16, 2020, all of which are hereby expressly incorporated by reference into the present application.

TECHNICAL FIELD

The present embodiment relates to a camera device and an optical instrument.

BACKGROUND ART

A camera device is a device that takes a picture or video of a subject and is installed in an optical instrument such as a smartphone, a drone, or a vehicle. To improve video quality, the camera device may have: optical image stabilization (OIS) function that compensates for image shake caused by user movement; auto focus (AF) function that automatically adjusts the distance between the image sensor and the lens to align the focal length of the lens; and zoom function that increases or decreases the magnification of a distant subject through a zoom lens.

Meanwhile, in recent years, due to the strengthening of mobile phone functions, the number of pixels has been increased, the zoom function has been strengthened, and the adoption of multi-camera devices in mobile phones is increasing.

However, due to the increase in the electromagnetic force of the zoom camera device, when the zoom camera device is applied to a multi-camera device, a technology for electromagnetic shielding design between the zoom camera device and other camera devices is required.

DETAILED DESCRIPTION OF THE INVENTION

Technical Subject

The present embodiment is intended to provide a camera device for shielding an electromagnetic field that affects another camera device adjacent to the zoom camera device and comprising a structure for increasing the electromagnetic force.

Technical Solution

A camera device according to the present embodiment comprises: a housing; a mover being disposed inside the housing; a first magnet and coil for tilting the mover with respect to a first axis; a second magnet and a second coil for tilting the mover with respect to a second axis, which is perpendicular to the first axis; and a lens module being moved along a third axis perpendicular to the first and second axes, wherein a light enters along the first axis, and wherein a first yoke may be disposed between the second magnet and the mover.

A camera device according to the present embodiment comprises: a housing; a mover being disposed inside the housing; a lens module being spaced apart from the mover and comprising a lens; and a first yoke being disposed between the mover and the housing, wherein the mover is tilted with respect to a first axis and tilted with respect to a second axis perpendicular to the first axis, wherein the lens module is moved along a third axis perpendicular to the first axis and the second axis, wherein a light is incident along the first axis, and wherein the first yoke may be disposed to be overlapped with the first shaft.

A camera device according to the present embodiment comprises: a first housing; a first unit comprising a first mover being disposed inside the first housing and a yoke being disposed between the first mover and the first housing; and a second unit comprising a second housing and a second mover being disposed inside the second housing, wherein the first unit performs an image stabilization function, wherein the second unit performs a focusing function, wherein the first mover comprises a first surface and a second surface being disposed in a direction perpendicular to the first surface, and wherein the yoke of the first unit may comprise a first yoke being disposed between the first surface of the first mover and the first housing and a second yoke being disposed between the second surface of the first mover and the first housing.

The first yoke and the second yoke may be disposed parallel to a direction in which the second mover moves.

The camera device comprises: a first magnet and a first coil for tilting the first mover with respect to a first axis; and a second magnet and a second coil for tilting the first mover with respect to a second axis perpendicular to the first axis, wherein a light is incident along the first axis, and wherein the first mover, the first yoke, the second magnet, and the second coil may be sequentially disposed along the first axis.

The first yoke may have an upper surface or a lower surface perpendicular to the first axis.

The camera device may comprise a driving plate being disposed between the first housing and the first mover.

The second mover may move along a third axis perpendicular to the first axis and the second axis, and the driving plate may be disposed between the first housing and the first mover in a third axis direction.

At least a portion of the first yoke may be overlapped with the first magnet in the third axis direction.

The length of the first yoke in the second axis direction may be 1.2 to 1.6 times the length of the second magnet.

The length of the first yoke in the second axis direction may be 1.3 to 1.5 times the length of the second magnet.

In the camera device, the first mover may comprise a reflective member.

The light may be incident to the reflective member along the first axis.

The reflective member may reflect the light to a lens module being coupled to the second mover.

The second yoke may be disposed between the first magnet and the first mover.

In the second axis direction, the first yoke may be longer than the length of the second magnet.

The area of the first yoke may be greater than the area of the second magnet.

The length of the long axis of the first yoke may be greater than the length of the long axis of the second magnet.

The area of one surface of the first yoke may be greater than the area of one surface of the second magnet facing the one surface of the first yoke.

The second yoke may comprise two second yokes being disposed at an opposite side to each other with respect to the first mover, and the first yoke and the two second yokes may form a ‘c’ shape.

The first magnet comprises two first magnets, the second yoke comprises two second yokes being disposed between the two first magnets and the first mover, and the first yoke may connect the two second yokes.

The first yoke may be overlapped with the first mover and the second magnet in the first axis direction.

The first mover comprises both side surfaces and an inclined surface between the both side surfaces, wherein the first magnet is disposed on both side surfaces of the first mover, and wherein the reflective member may be disposed on the inclined surface of the first mover.

The first magnet comprises: a first side magnet being disposed on one side surface of both side surfaces of the first mover; and a second side magnet being disposed on the other side surface of the both side surfaces of the first mover, wherein in the second axis direction, the length of the first yoke may be equal to the distance between the first side magnet and the second side magnet.

In the second axis direction, the distance between the first magnet and the second magnet may be less than ¼ of the length of the second magnet in a corresponding direction.

The first mover comprises a first groove being formed on the first surface, and the first yoke and the second magnet may be disposed inside the first groove.

The first mover comprises a second groove being formed on the second surface of the first mover, the first magnet is disposed in the second groove of the first mover, and at least a portion of the first magnet may be open toward the first groove of the first mover.

The first mover comprises a third groove being formed in the first groove of the first mover, wherein an adhesive for fixing the first yoke to the first mover may be disposed in the third groove of the first mover.

The first magnet may comprise a magnet formed to be a single one by bonding 2-pole magnetized magnets with an adhesive.

The camera device comprises: a third magnet being disposed on the first mover; and a fourth magnet being disposed in the first housing to exert an attractive force with the third magnet, and the driving plate may be disposed between the third magnet and the fourth magnet.

The driving plate comprises: a base; a first protruded portion in the shape of a hemisphere being protruded from a first surface of the base; and a second protruded portion in the shape of a hemisphere being protruded from a second surface at an opposite side of the first surface of the base, wherein the first housing comprises a groove in which at least a portion of the first protruded portion is disposed, and wherein the first mover may comprise a groove in which at least a portion of the second protruded portion is disposed.

The first protruded portion comprises two first protruded portions; the two first protruded portions are spaced apart in a first direction; the second protruded portion comprises two second protruded portions; the two second protruded portions are spaced apart in a second direction perpendicular to the first direction; and the first protruded portion and the second protruded portion may be integrally formed with the base.

An actuator for moving the second mover in the third axis direction may be comprised.

The optical instrument according to the present embodiment comprises: the camera device; and an additional camera device being spaced apart from the camera device, wherein the additional camera device comprises a lens driving device being disposed adjacent to the housing and a lens being coupled to the lens driving device and facing the first axis direction, and wherein the lens driving device may comprise a magnet and a first coil for moving the lens in the first axis direction.

The lens driving device may comprise a second coil being disposed at a position corresponding to the magnet to move the lens in a direction perpendicular to the first axis.

An optical instrument according to the present embodiment may comprise: a main body; the camera device being disposed in the main body; and a display being disposed in the main body and outputting an image photographed by the camera device.

Advantageous Effects

Through the present embodiment, leakage flux generated from a zoom camera device can be minimized.

Through this, the distance between the zoom camera device and other camera devices can be minimized, so that the design freedom can be increased when the camera device is disposed inside the smartphone. Through this, the arrangement of other parts of the smartphone, such as increasing the battery of the smartphone, can be facilitated.

BEST MODE

Figure 1:
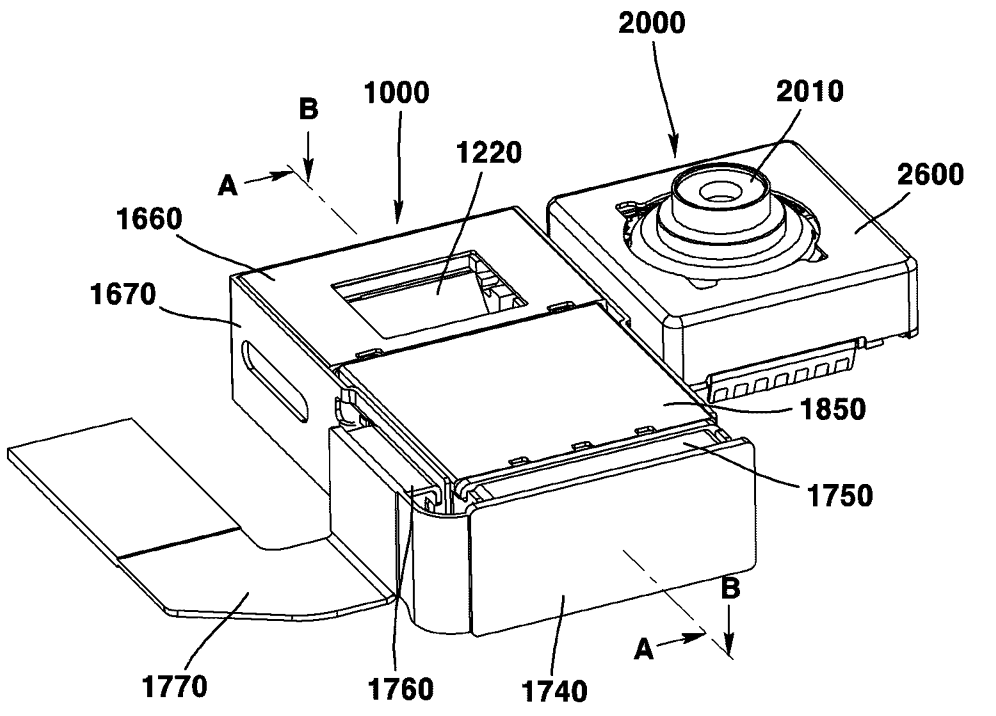
FIG. 1 is a perspective view illustrating a camera device according to a present embodiment.

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as “at least one (or more than one) of A and B and C”, it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being ‘connected’, ‘coupled’ or ‘interconnected’ to another component, the component is not only directly connected, coupled or interconnected to the other component, but may also comprise cases of being ‘connected’, ‘coupled’, or ‘interconnected’ due that another component between that other components.

In addition, when described as being formed or arranged in “on (above)” or “below (under)” of each component, “on (above)” or “below (under)” means that it comprises not only the case where the two components are directly in contact with, but also the case where one or more other components are formed or arranged between the two components. In addition, when expressed as “on (above)” or “below (under)”, the meaning of not only an upward direction but also a downward direction based on one component may be comprised.

An ‘optical axis direction’ used hereinafter is defined as an optical axis direction of a lens coupled to a lens driving device. Therefore, the ‘optical axis direction’ may coincide with the light axis direction of the image sensor of the camera device.

The ‘auto focus (AF) function’ used hereinafter is defined as a function that automatically focuses on a subject by adjusting the distance to the image sensor by moving the lens in an optical axis direction according to the distance of the subject so that a clear image of the subject can be obtained on the image sensor. Meanwhile, ‘auto focus’ may be used interchangeably with ‘auto focus (AF)’.

The ‘handshake correction function’ used hereinafter is defined as a function of moving or tilting a lens in a direction perpendicular to an optical axis direction to offset vibration (movement) generated in an image sensor by an external force. Meanwhile, ‘handshake correction’ may be used interchangeably with ‘OIS’ or ‘optical image stabilization’.

The ‘zoom function’ used hereinafter is defined as a function that arbitrarily adjusts the size of a subject even when the camera and the subject are simultaneously fixed and photographed. When the camera zooms toward the subject, it is called zoom-in, and when the camera zooms away from the subject, it is called zoom-out. Zoom-in enlarges the subject while reducing the depth of field, while zoom-out reduces the subject and increases the depth of field. ‘Zooming’ can be used interchangeably with ‘Zoom’.

A camera may comprise a camera device. A camera device may comprise a camera module.

The camera device may comprise a first camera device 1000. The camera device may comprise a second camera device 2000. A camera device may comprise a plurality of camera devices. A camera device may comprise two camera devices. A camera device may comprise a dual camera device. Or, the camera device may comprise triple or more camera devices.

Hereinafter, a first camera device according to a present embodiment will be described with reference to drawings.

Figure 2:
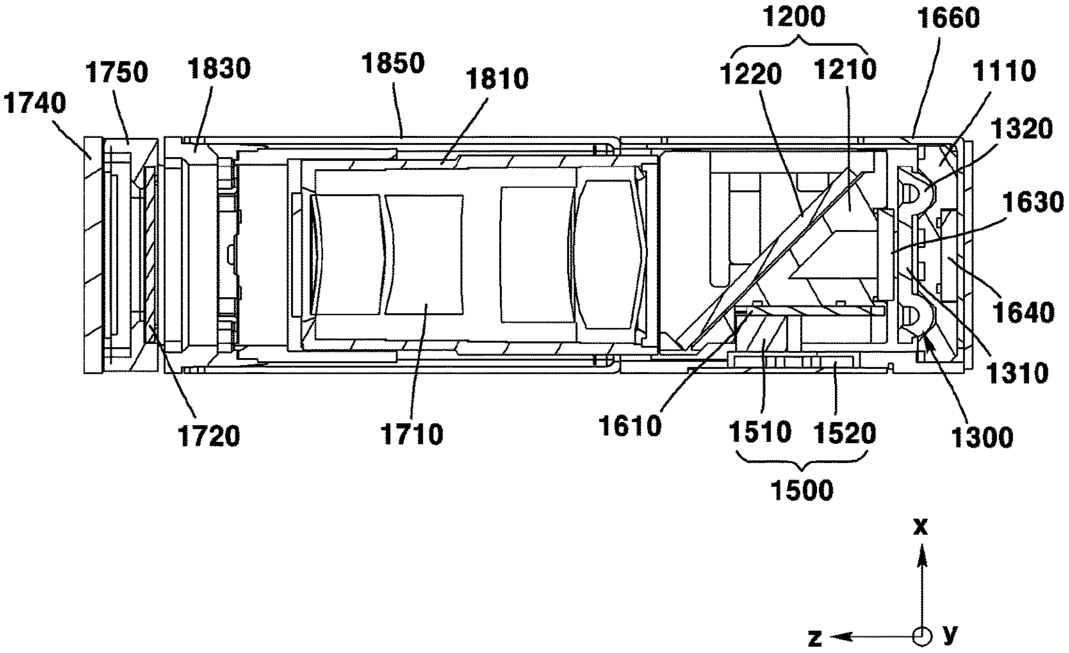
FIG. 2 is a cross-sectional view viewed from A-A in FIG. 1.
Figure 3:
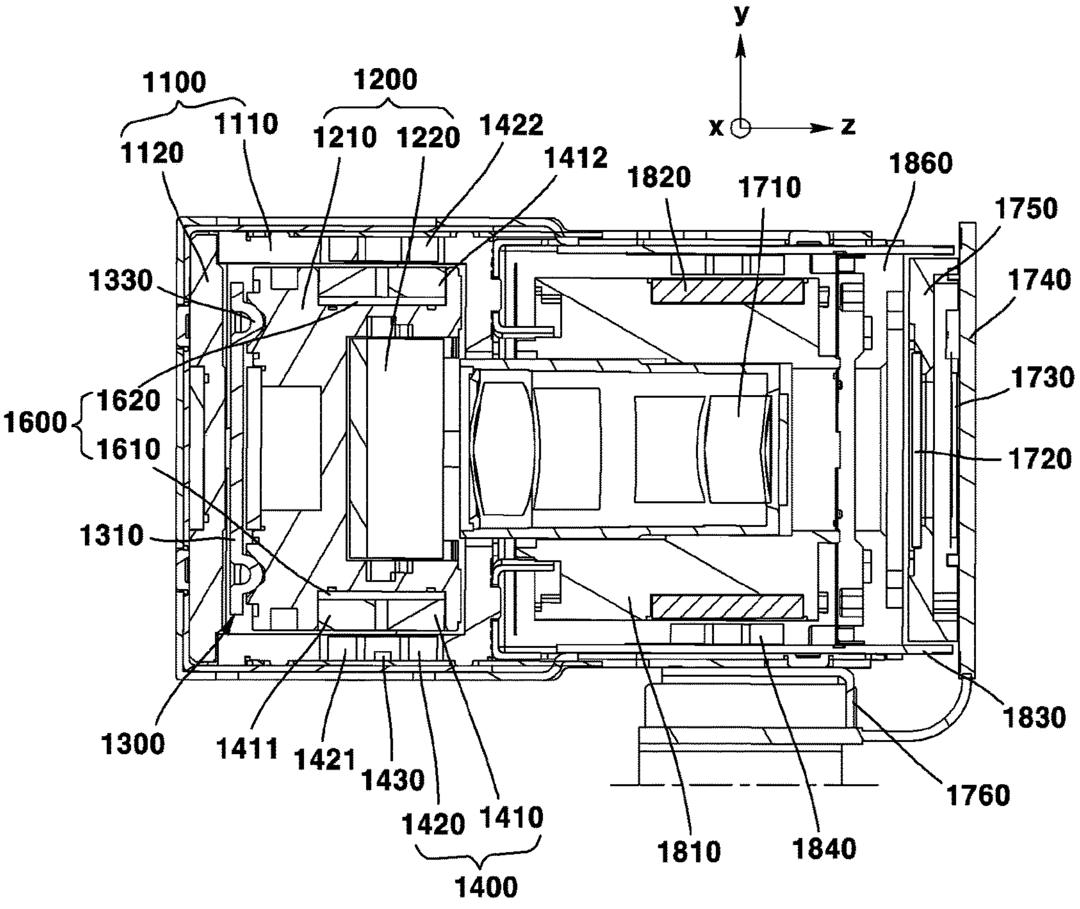
FIG. 3 is a cross-sectional view viewed from line B-B of FIG. 1.
Figure 4:
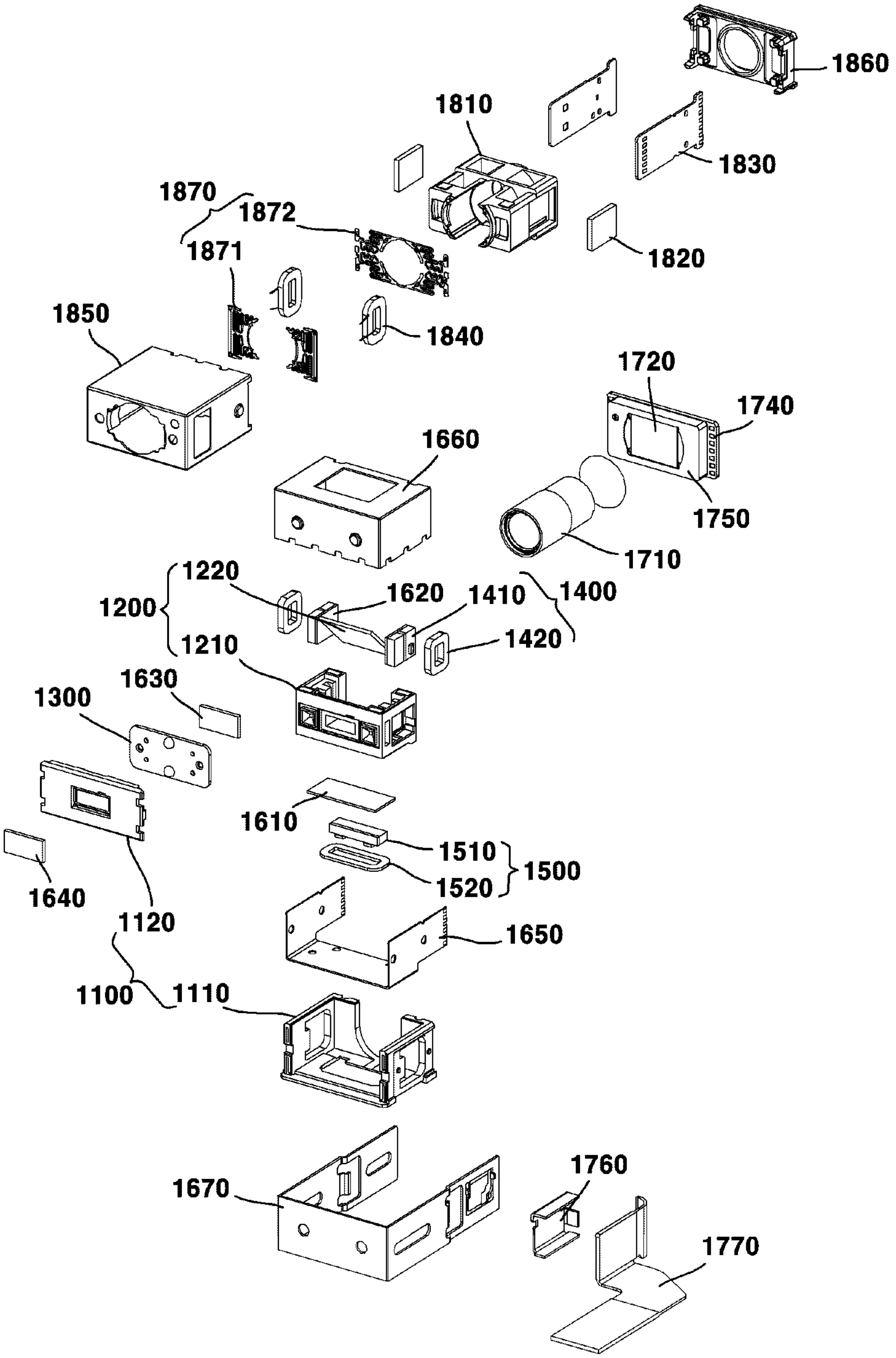
FIG. 4 is an exploded perspective view of a first camera device according to present embodiment.
Figure 5:
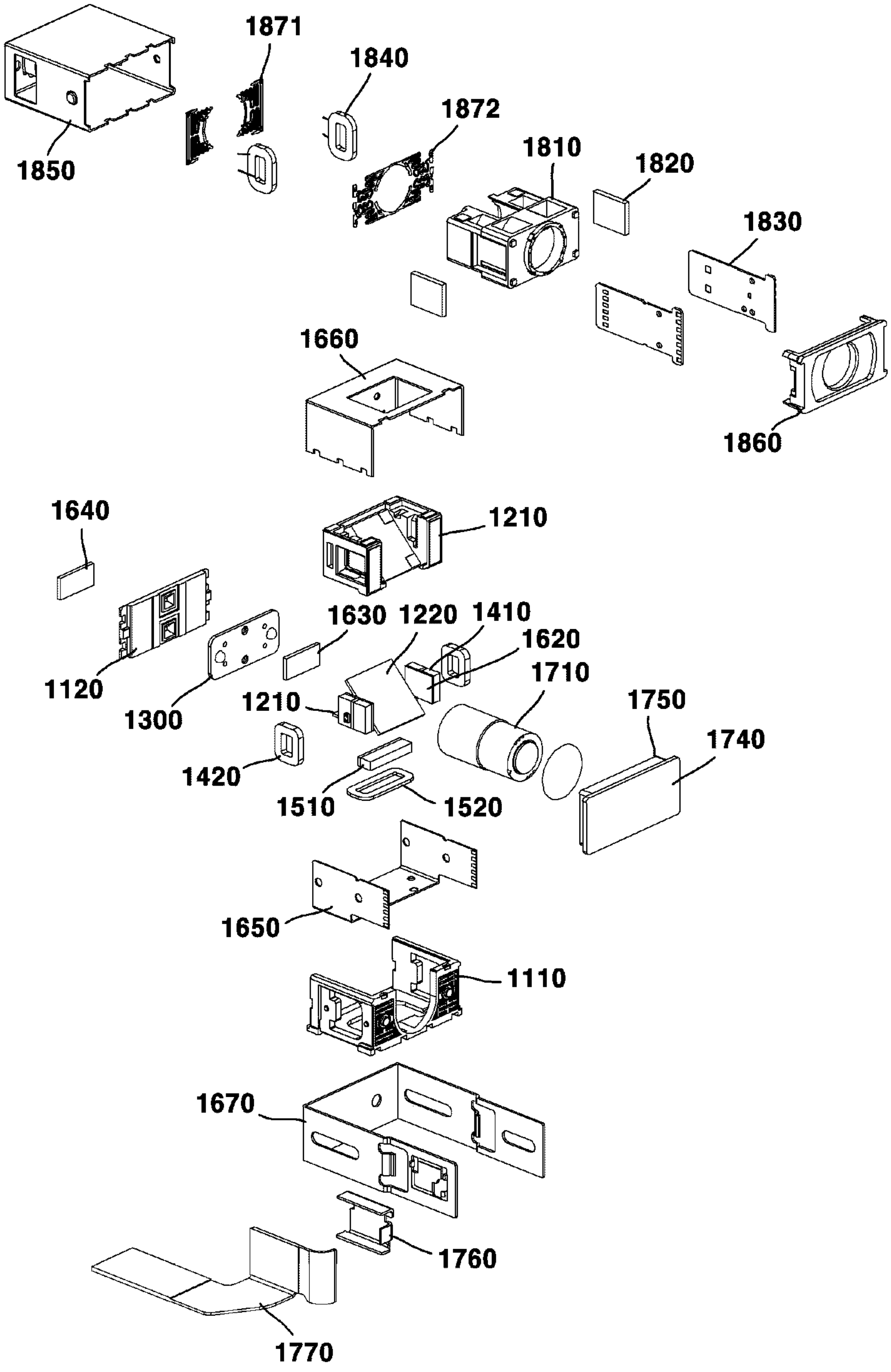
FIG. 5 is an exploded perspective view of a first camera device viewed from a direction different from that of FIG. 4.
Figure 6:
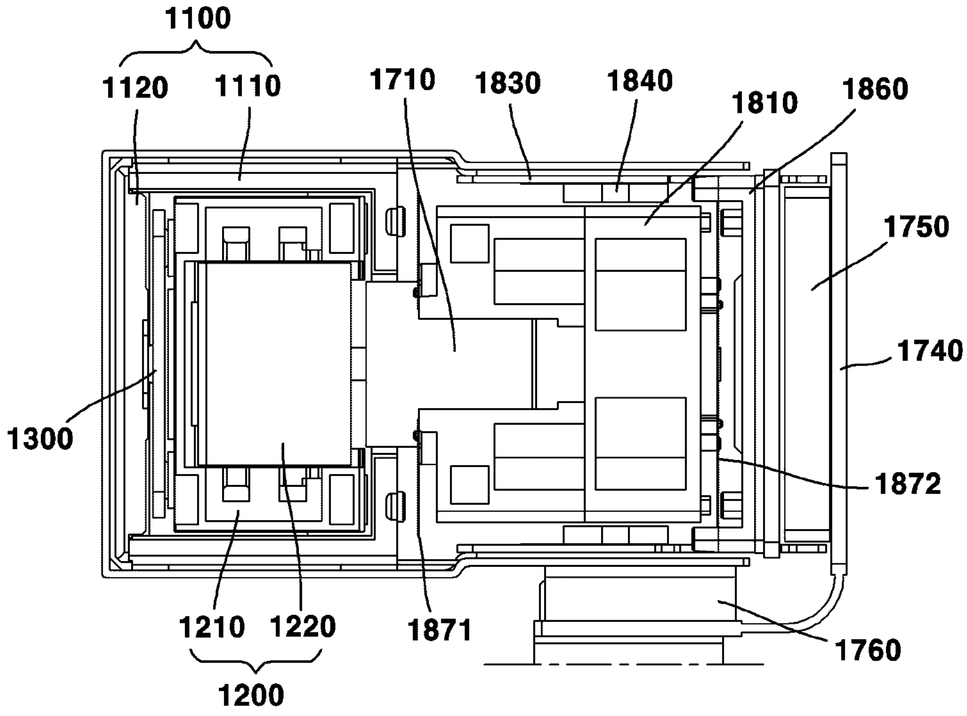
FIG. 6 is a plan view of a state in which a cover member is omitted in a first camera device according to present embodiment.
Figure 7:
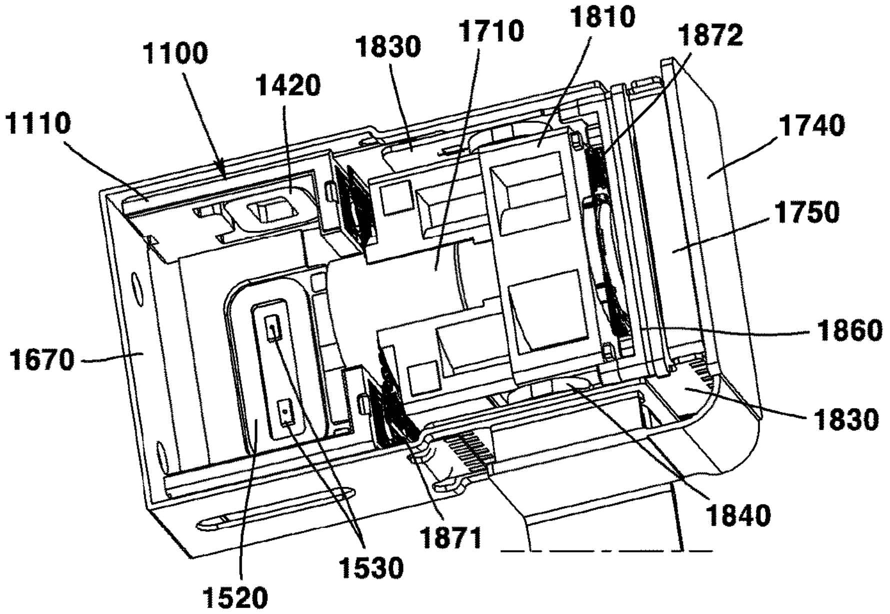
FIG. 7 is a perspective view of a state in which a mover and a rotation plate are omitted in the first camera device of FIG. 6.
Figure 8:
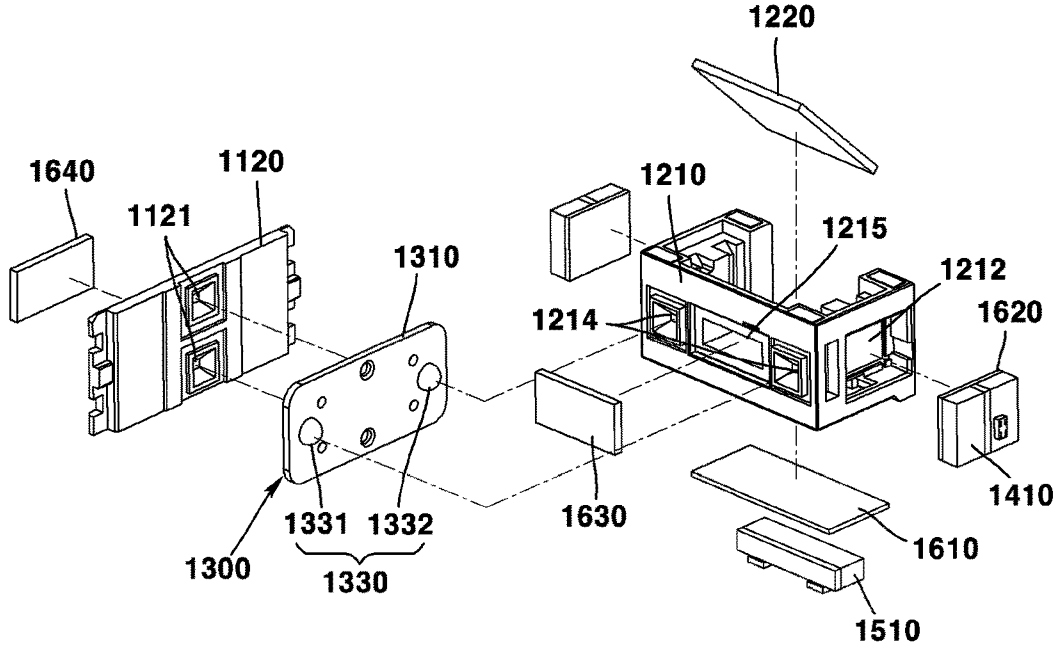
FIGS. 8 and 9 are diagrams illustrating an assembly relationship between a mover, a rotation plate, and related configurations of a first camera device according to a present embodiment.
Figure 9:
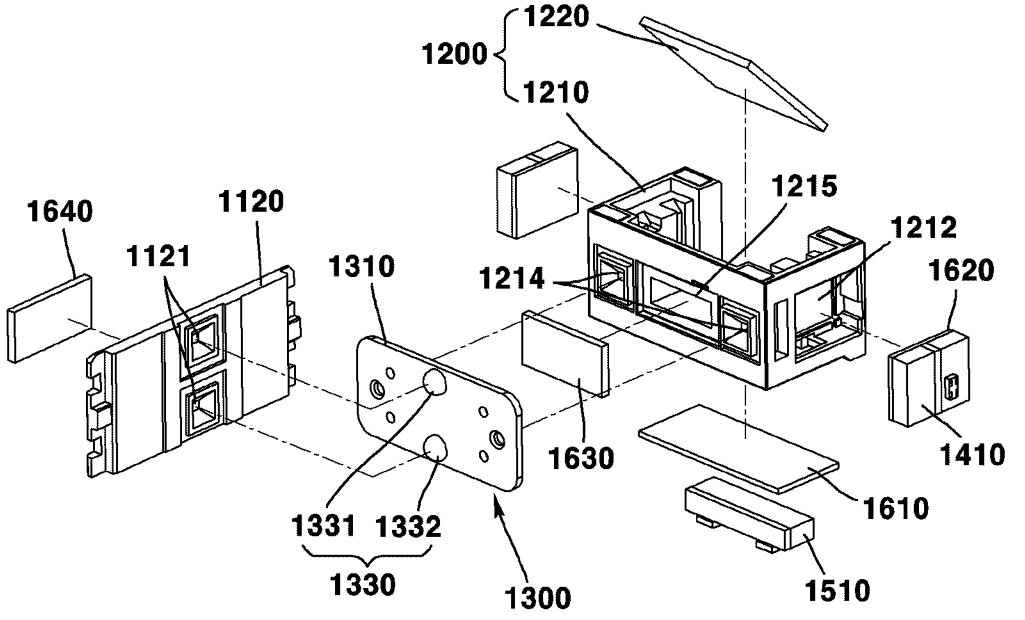
Figure 10:
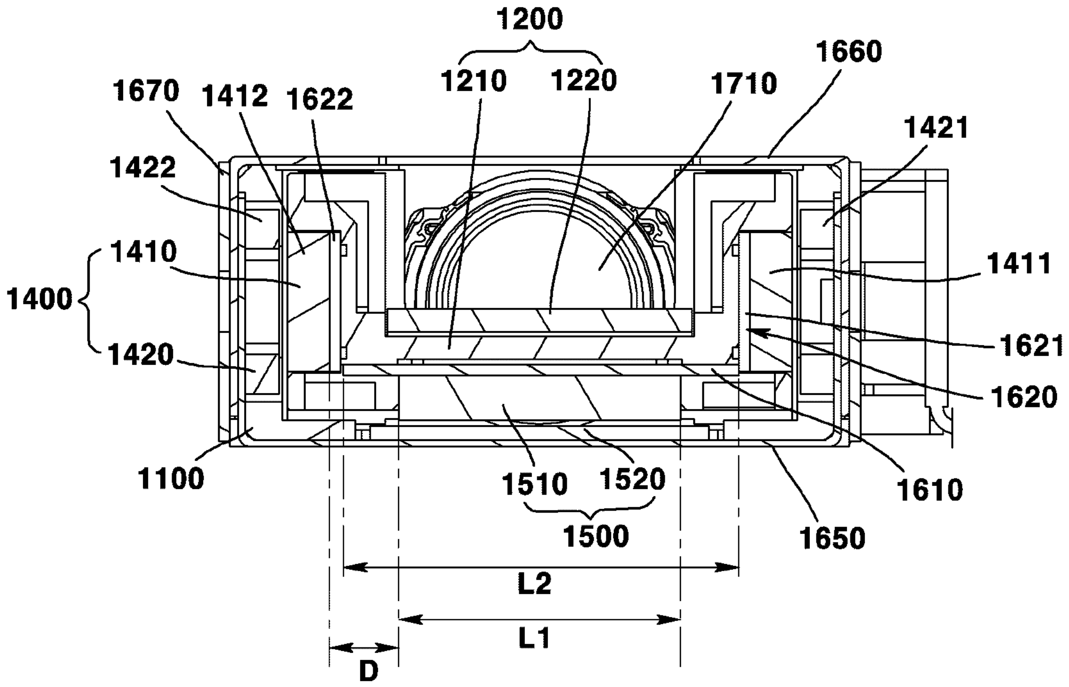
FIG. 10 is a cross-sectional view of a mover and related configurations of a first camera device according to a present embodiment cut in a vertical direction and viewed from the front.
Figure 11:
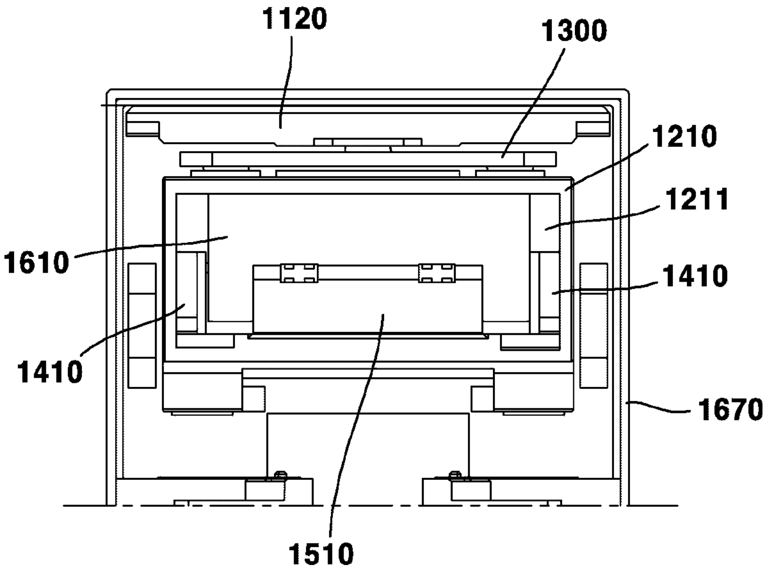
FIG. 11 is a cross-sectional view of a mover and related configurations of a first camera device according to a present embodiment cut in a horizontal direction and viewed from below.
Figure 12:
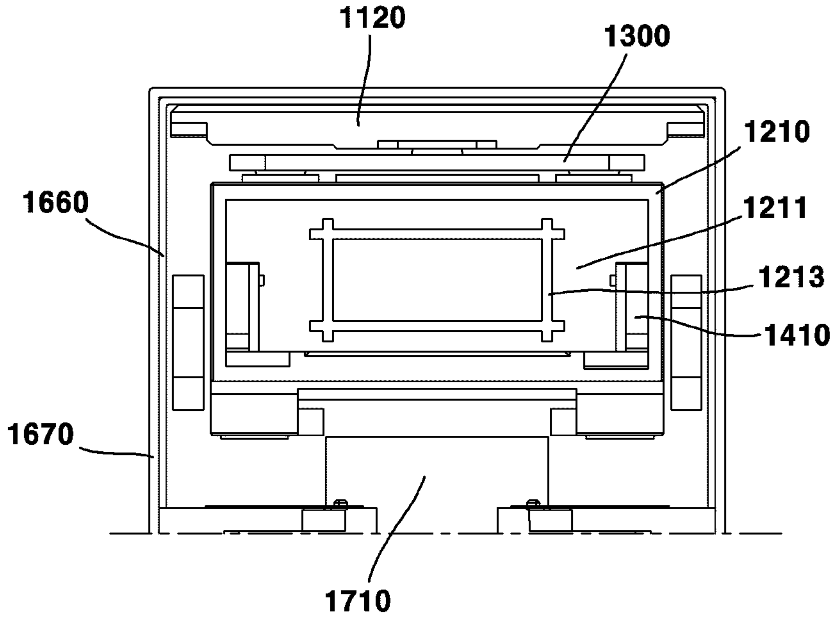
FIG. 12 is a diagram of a state in which a second magnet and a first yoke are omitted in the first camera device of FIG. 11.
Figure 13A:
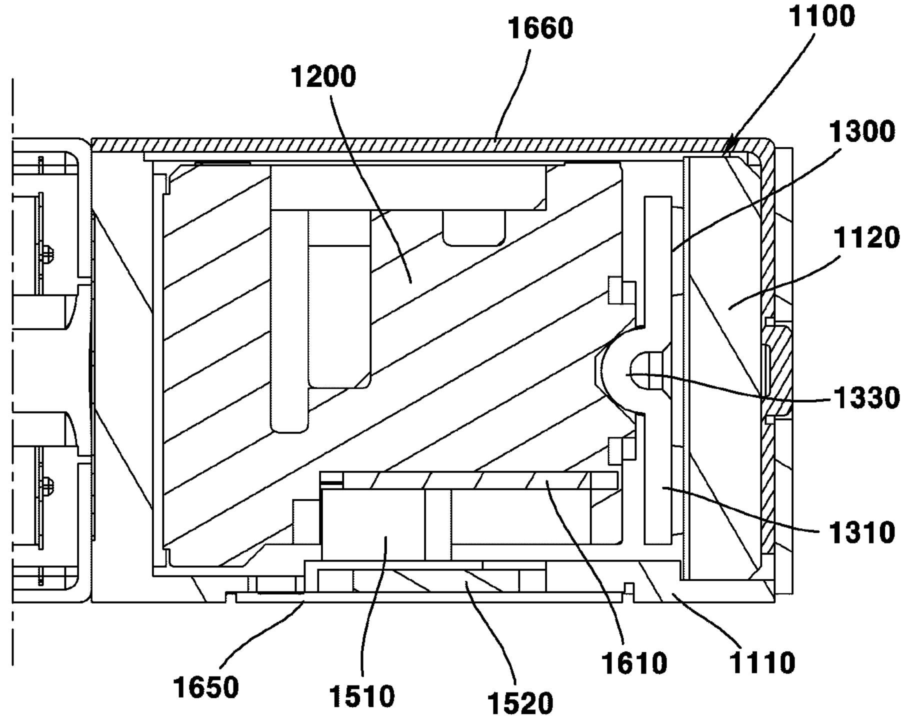
FIGS. 13*a* to 13*c* are cross-sectional views illustrating a state in which a mover of a first camera device according to the present embodiment is tilted about a y-axis.
Figure 13B:
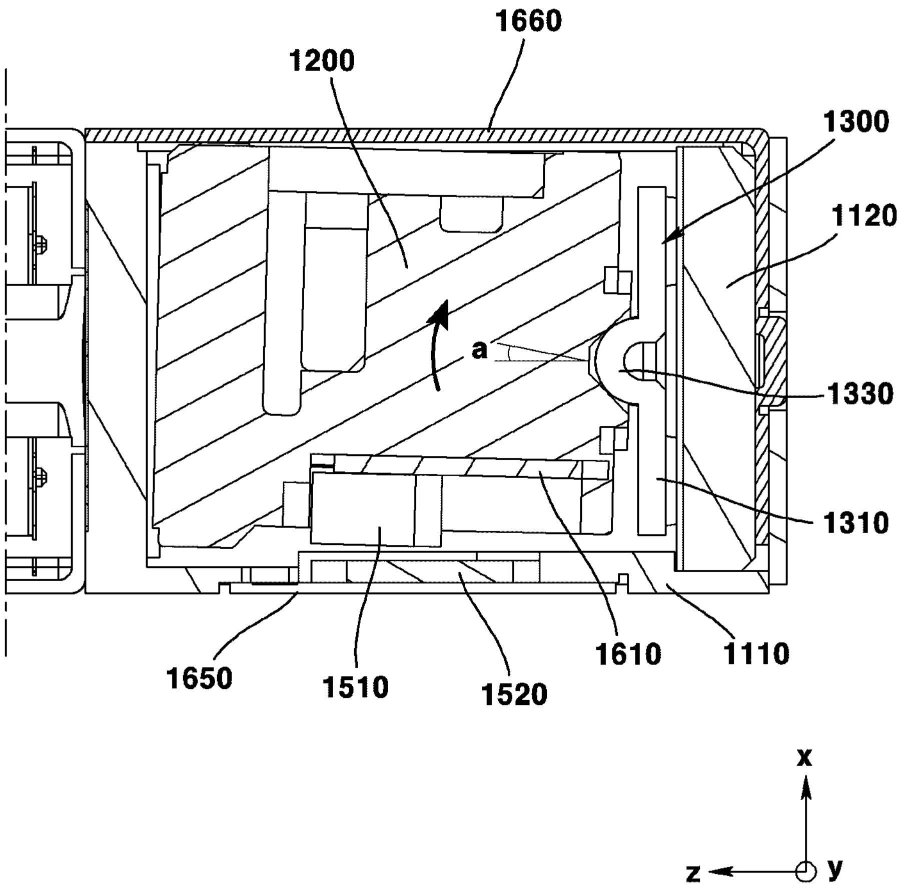
Figure 13C:
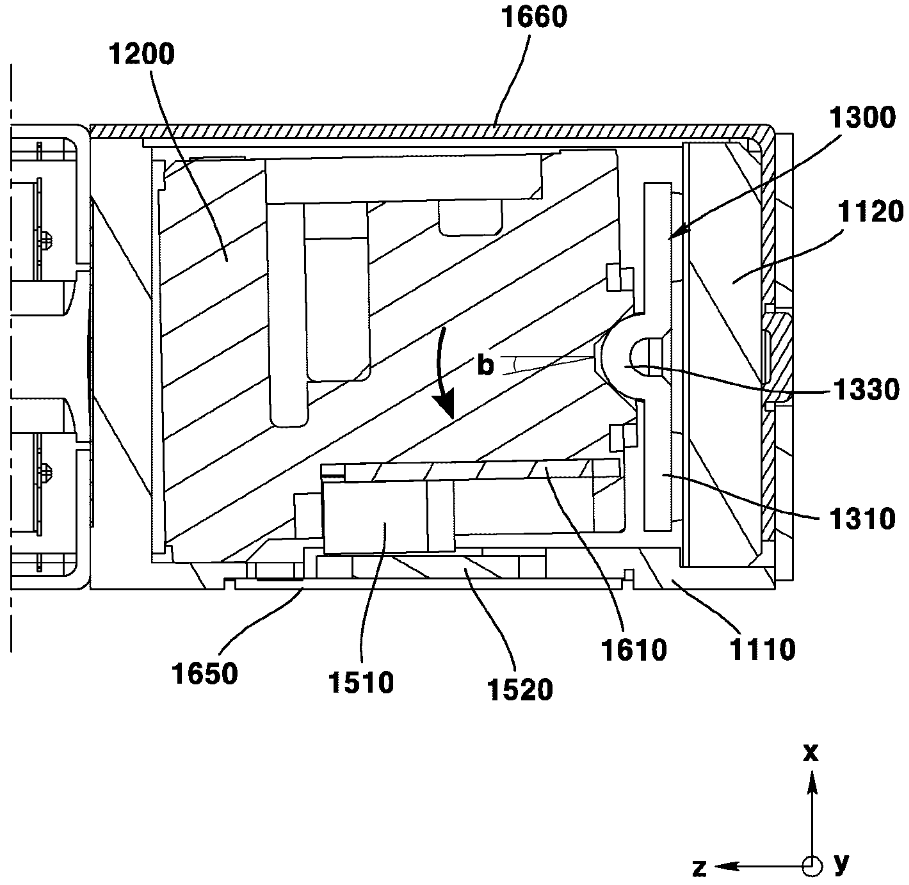
Figure 14A:
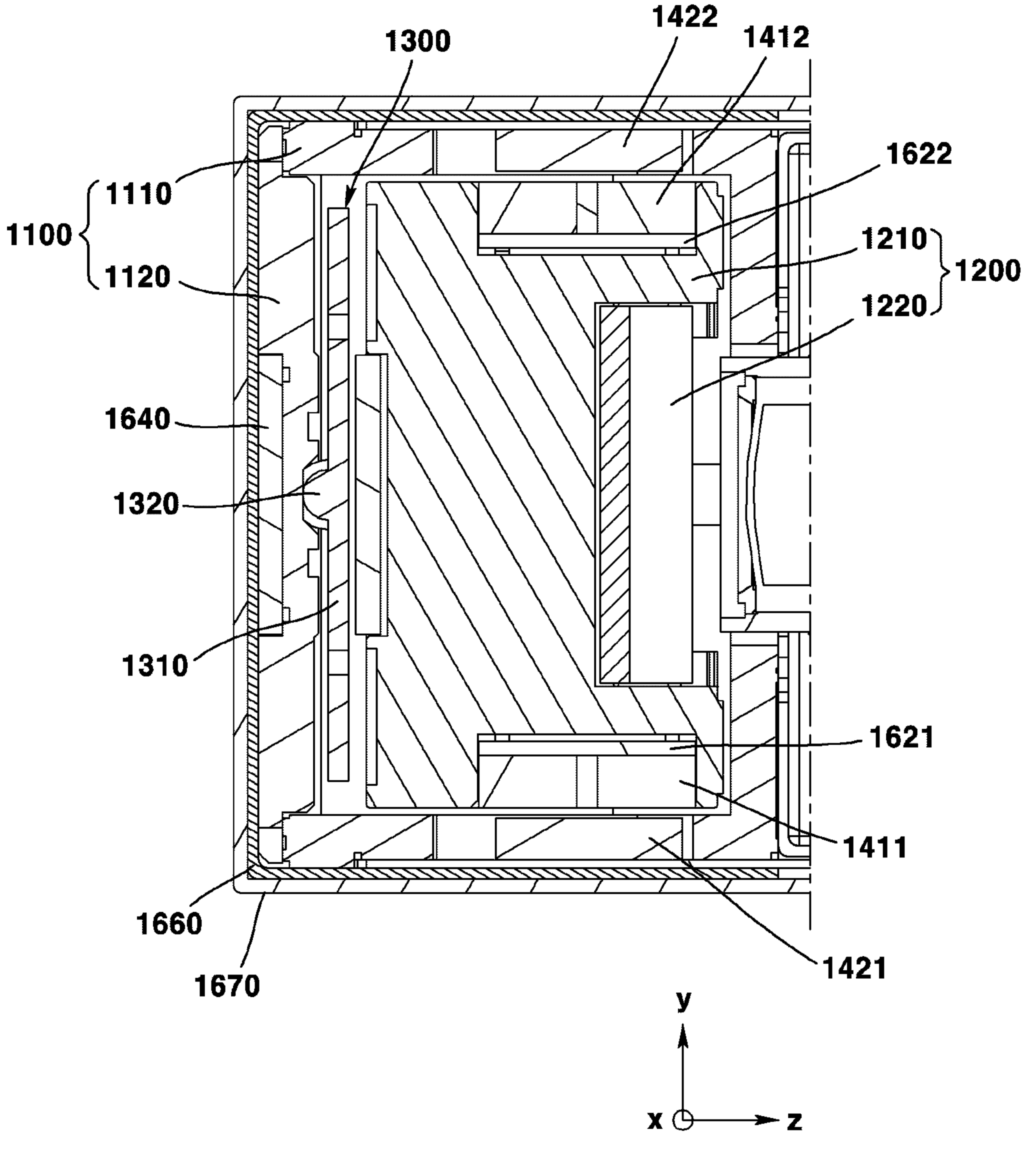
FIGS. 14*a* to 14*c* are cross-sectional views illustrating a state in which a mover of a first camera device according to a present embodiment is tilted about an x-axis.
Figure 14B:
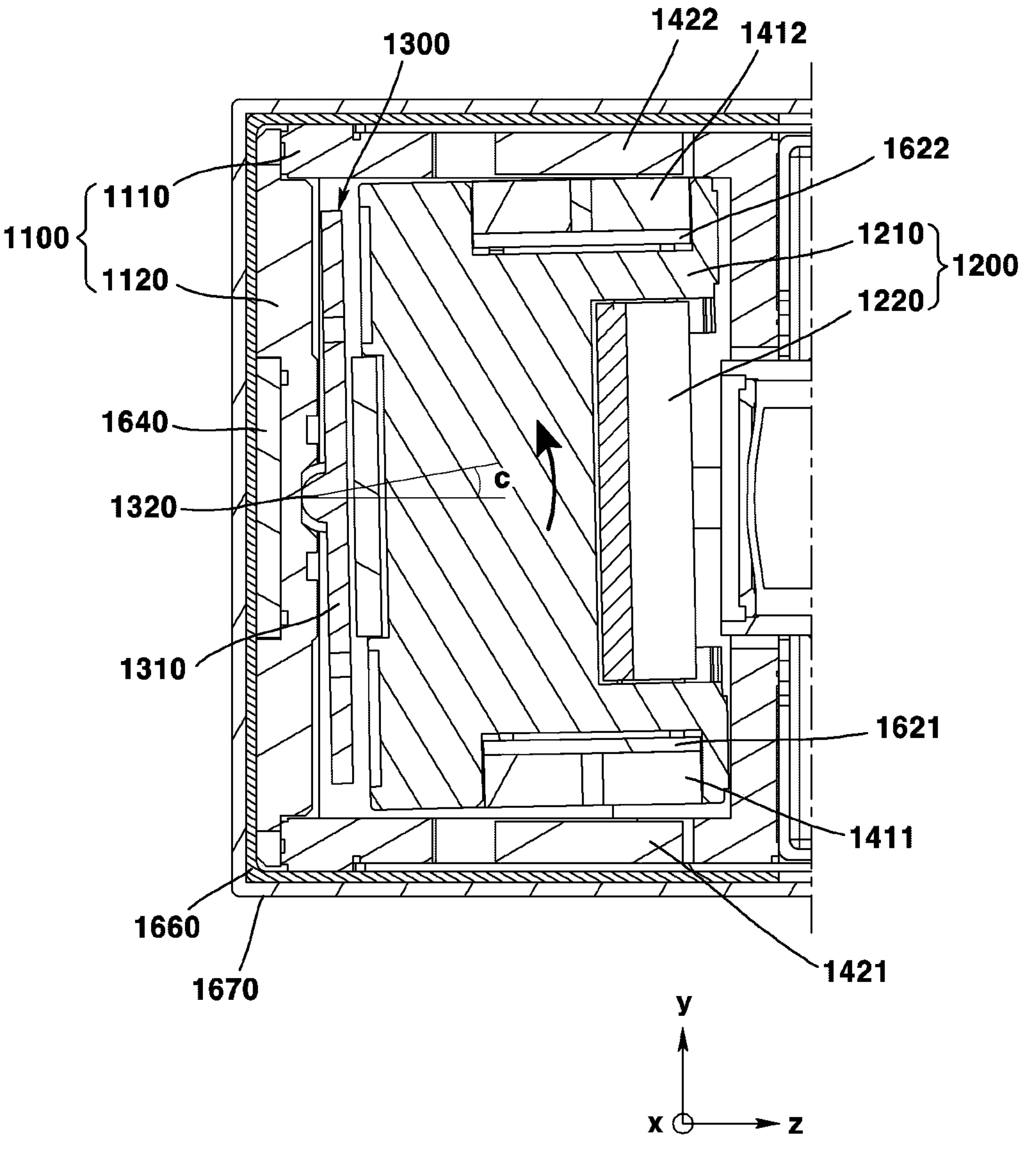
Figure 14C:
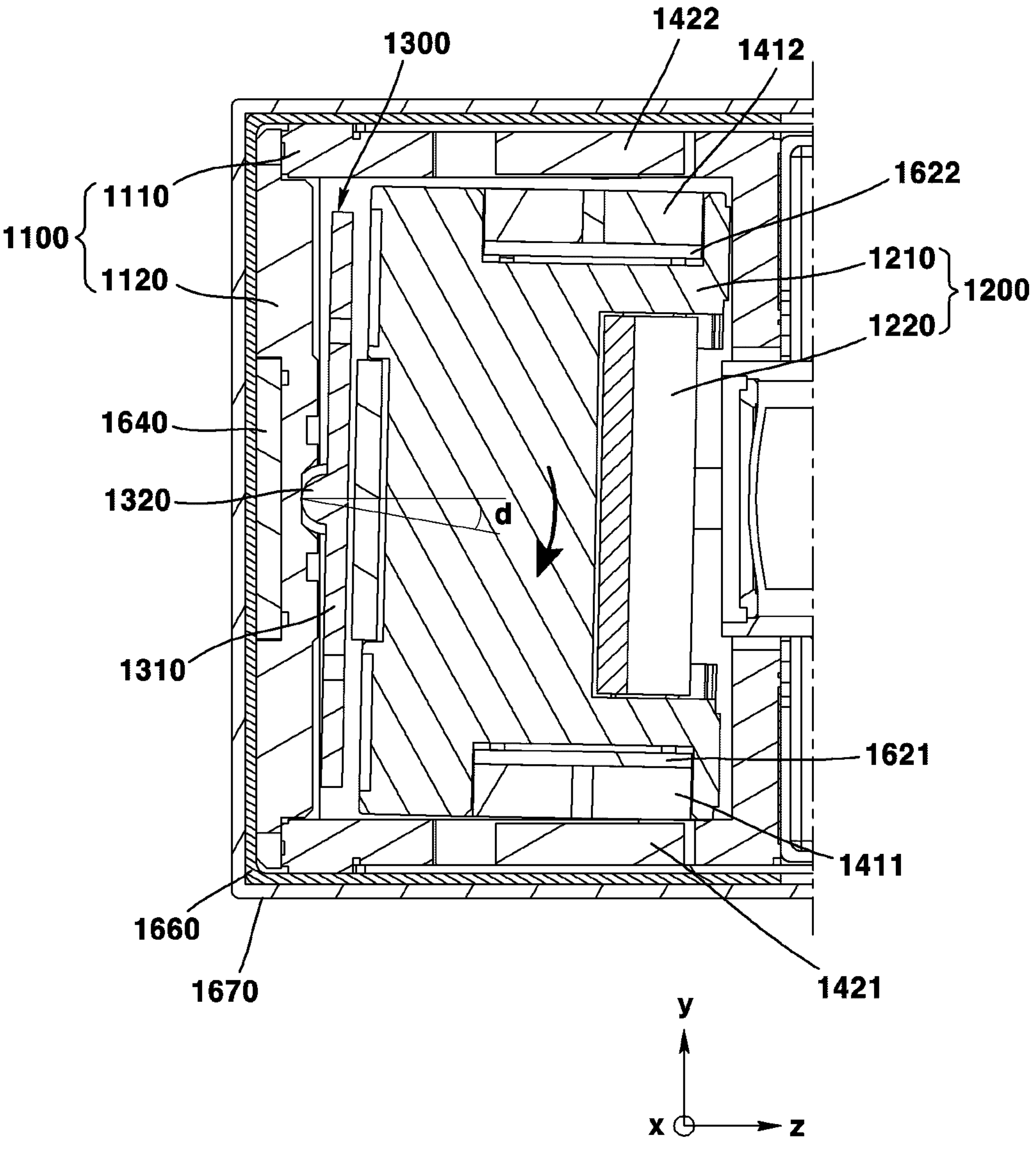
Figure 15:
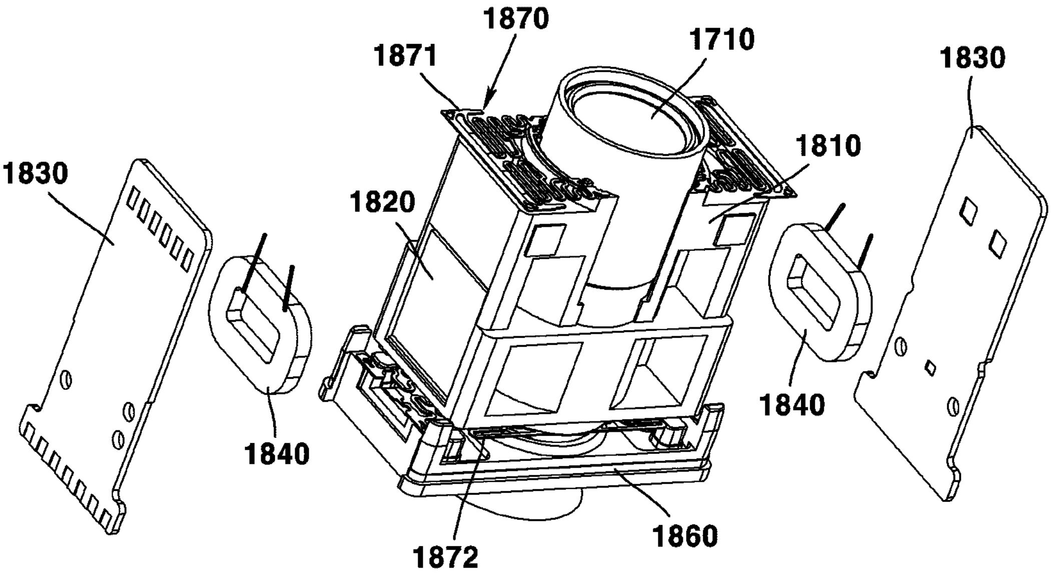
FIG. 15 is an exploded perspective view of a lens actuator provided for auto focus (AF) and zoom in a first camera device according to the present embodiment.

FIG. 1 is a perspective view illustrating a camera device according to a present embodiment; FIG. 2 is a cross-sectional view viewed from A-A in FIG. 1; FIG. 3 is a cross-sectional view viewed from line B-B of FIG. 1; FIG. 4 is an exploded perspective view of a first camera device according to present embodiment; FIG. 5 is an exploded perspective view of a first camera device viewed from a direction different from that of FIG. 4; FIG. 6 is a plan view of a state in which a cover member is omitted in a first camera device according to present embodiment; FIG. 7 is a perspective view of a state in which a mover and a rotation plate are omitted in the first camera device of FIG. 6; FIGS. 8 and 9 are diagrams illustrating an assembly relationship between a mover, a rotation plate, and related configurations of a first camera device according to a present embodiment; FIG. 10 is a cross-sectional view of a mover and related configurations of a first camera device according to a present embodiment cut in a vertical direction and viewed from the front; FIG. 11 is a cross-sectional view of a mover and related configurations of a first camera device according to a present embodiment cut in a horizontal direction and viewed from below; FIG. 12 is a diagram of a state in which a second magnet and a first yoke are omitted in the first camera device of FIG. 11; FIGS. 13*a* to 13*c* are cross-sectional views illustrating a state in which a mover of a first camera device according to the present embodiment is tilted about a y-axis; FIGS. 14*a* to 14*c* are cross-sectional views illustrating a state in which a mover of a first camera device according to a present embodiment is tilted about an x-axis; and FIG. 15 is an exploded perspective view of a lens actuator provided for auto focus (AF) and zoom in a first camera device according to the present embodiment.

The first camera device 1000 may comprise a lens 1710. The lens 1710 may be disposed between the prism 1220 and an image sensor 1730. The lens 1710 may be aligned with the image sensor 1730. The lens 1710 may be disposed at a position corresponding to the image sensor 1730. The lens 1710 may be disposed inside a barrel. The lens 1710 may be coupled with a lens actuator. The lens 1710 may comprise a plurality of lenses.

The first camera device 1000 may comprise a filter 1720. The filter 1720 may serve to block the light of a specific frequency band among the light passing through the lens 1710 from entering the image sensor 1730. The filter 1720 may be disposed between the lens 1710 and the image sensor 1730. The filter 1720 may be disposed in a sensor base 1750. Or, the filter 1720 may be disposed in a base 1860. The filter 1720 may comprise an infrared filter. The infrared filter may block light in the infrared region from being incident on the image sensor 1730.

The first camera device 1000 may comprise an image sensor 1730. In the image sensor 1730, light passing through the lens 1710 and the filter 1720 may be incident and form an image. The image sensor 1730 may be disposed in the printed circuit board 1740. The image sensor 1730 may be electrically connected to the printed circuit board 1740. For an example, the image sensor 1730 may be coupled to the printed circuit board 1740 by surface mounting technology (SMT). As another example, the image sensor 1730 may be coupled to the printed circuit board 1740 using flip chip technology. The image sensor 1730 may be disposed such that an optical axis coincides with the lens 1710. That is, the optical axis of the image sensor 1730 and the optical axis of the lens 1710 may be aligned. The image sensor 1730 may convert light irradiated onto an effective image area of the image sensor 1730 into an electrical signal. The image sensor 1730 may be any one among a charge coupled device (CCD), a metal oxide semiconductor (MOS), a CPD, and a CID.

The first camera device 1000 may comprise a printed circuit board (PCB) 1740. The printed circuit board 1740 may be a substrate or a circuit board. A sensor base 1750 may be disposed in the printed circuit board 1740. The printed circuit board 1740 may be electrically connected to a first driving unit 1400, a second driving unit 1500, and a coil 1840. The printed circuit board 1740 may comprise various circuits, elements, control units, and the like to convert an image formed by the image sensor 1730 into an electrical signal and transmit the converted electrical signal to an external device.

The first camera device 1000 may comprise a sensor base 1750. The sensor base 1750 may be disposed in the printed circuit board 1740. The sensor base 1750 may comprise a protruded portion at which the filter 1720 is disposed. An opening may be formed in a portion of the sensor base 1750 where the filter 1720 is disposed so that light passing through the filter 1720 may be incident to the image sensor 1730. The adhesive member may couple or attach the base 2310 to the sensor base 1750. The adhesive member may comprise any one or more among an epoxy, a thermosetting adhesive, and an ultraviolet curable adhesive.

The first camera device 1000 may comprise a support part 1760. The support part 1760 may be disposed between a connecting substrate 1770 and a cover member 1850. The support portion 1760 may be coupled to the cover member 1850 to fix the connecting substrate 1770.

The first camera device 1000 may comprise a connecting substrate 1770. The connecting substrate 1770 may be a configuration for connecting the first camera device 1000 to an external component. For an example, the connecting substrate 1770 may be connected to a power supply unit and/or a control unit.

The first camera device 1000 may comprise a prism actuator. The prism actuator may move a prism. The prism actuator may tilt the prism. The prism actuator may tilt the prism about two axes. The prism actuator may perform handshake correction function. The prism actuator can perform handshake correction function for 2 axes.

The first camera device 1000 may comprise a housing 1100. The housing 1100 may be formed to surround at least a portion of the mover 1200. The housing 1100 may be disposed outside the mover 1200. The housing 1100 may be disposed inside a first cover member 1660 and a second cover member 1670. The housing 1100 may be formed of an injection molding material. The housing 1100 may be a fixed part even when the mover 1200 and the rotation plate 1300 move.

The housing 1100 may comprise a body unit 1110. The body unit 1110 may comprise a portion surrounding at least a portion of the mover 1200. A first coil 1420 and a second coil 1520 may be disposed in the body unit 1110. The body unit 1110 may be spaced apart from the mover 1200.

The housing 1100 may comprise a side wall portion 1120. The side wall portion 1120 may be coupled to the body unit 1110. The side wall portion 1120 may be coupled to the body unit 1110 in a sliding manner. The side wall portion 1120 may be inserted into and coupled to the groove of the body unit 1110. The side wall portion 1120 may be disposed in front of the rotation plate 1300. The side wall portion 1120 may come into contact with the rotation plate 1300.

The side wall portion 1120 of the housing 1100 may comprise a groove 1121. The groove 1121 may accommodate at least a portion of the first protruded portion 1320 of the rotation plate 1300. The housing 1100 may comprise a groove 1121 in which at least a portion of the first protruded portion 1320 is disposed. The groove 1121 may comprise a shape corresponding to at least a portion of the first protruded portion 1320. The groove 1121 may be formed in a shape different from that of the first protruded portion 1320. As illustrated in FIGS. 9, 14*b* and 14*c*, the first protruded portion 1320 being disposed in the groove 1121 of the housing 1100 may be tilted about an x-axis (first axis).

The first camera device 1000 may comprise a mover 1200. The mover 1200 may be disposed inside the housing 1100. The mover 1200 may move inside the housing 1100. The mover 1200 may be tilted about at least two axes. The mover 1200 may be pivotally driven. The mover 1200 may be tilted with respect to a first axis. The mover 1200 may be rotated with respect to a first axis. The mover 1200 may be tilted with respect to a second axis perpendicular to the first axis. The mover 1200 may be rotated with respect to a second axis.

The mover 1200 may comprise a holder 1210. The holder 1210 of the mover 1200 may comprise both side surfaces and a first surface and a second surface connecting the both side surfaces. At this time, the first magnet 1410 may be disposed on both side surfaces of the mover 1200. A second magnet 1510 may be disposed on a first surface of the mover 1200. The rotation plate 1300 may be disposed on a second surface of the mover 1200.

The holder 1210 of the mover 1200 may comprise a first groove 1211. The first groove 1211 may be formed on a first surface of the holder 1210. At this time, the first yoke 1610 and the second magnet 1510 may be disposed inside the first groove 1211. Meanwhile, at least a portion of the first magnet 1410 may be open toward the first groove 1211 of the mover 1200. That is, at least a portion of the first magnet 1410 can be seen when looking at the mover 1200 from below.

The holder 1210 of the mover 1200 may comprise a second groove 1212. The second groove 1212 may be formed on both side surfaces of the mover 1200. At this time, the first magnet 1410 may be disposed in a second groove 1212 of the mover 1200. The second yoke 1620 may be disposed in the second groove 1212 of the mover 1200. The groove 1212 may be formed in a shape corresponding to the second yoke 1620 and the first magnet 1410. The groove 1212 may be formed to a depth at which the first magnet 1410 is not protruded. Or, a portion of the first magnet 1410 being disposed in the groove 1212 may be protruded.

The holder 1210 of the mover 1200 may comprise a third groove 1213. The third groove 1213 may be formed in the first groove 1211 of the mover 1200. An adhesive for fixing the first yoke 1610 to the mover 1200 may be disposed in the third groove 1213 of the mover 1200. The third groove 1213 may be an 'adhesive accommodating groove'. The third groove 1213 may be formed by being recessed into the bottom surface of the first groove 1211 of the mover 1200.

The holder 1210 of the mover 1200 may comprise a groove 1214. The groove 1214 may be a 'rotation plate accommodating groove'. At least a portion of the second protruded portion 1330 of the rotation plate 1300 may be disposed in the groove 1214. The groove 1214 may accommodate at least a portion of the second protruded portion 1330 of the rotation plate 1300. The groove 1214 may comprise a shape corresponding to at least a portion of the second protruded portion 1330. The groove 1214 may be formed in a shape different from that of the second protruded portion 1330. As illustrated in FIGS. 8, 13*b* and 13*c*, the second protruded portion 1330 being disposed in the groove 1214 of the mover 1200 may be tilted about a y-axis (second axis).

The holder 1210 of the mover 1200 may comprise a groove 1215. The groove 1215 may be a 'third magnet accommodating groove'. A third magnet 1630 may be disposed in the groove 1215. The groove 1215 may be formed in a shape corresponding to that of the third magnet 1630. The groove 1215 may be formed on a second surface of the mover 1200.

The mover 1200 may comprise a reflective member. The reflective member may comprise a prism 1220. The prism 1220 may be disposed in holder 1210. The prism 1220 may comprise a reflective surface that reflects light incident on the prism 1220. The prism 1220 may be disposed in the holder 1210 so that the reflective surface of the prism 1220 is inclined. The prism 1220 may change an optical path of light incident on the prism 1220. The prism 1220 may reflect light incident along a first axis direction toward a third axis direction. The prism 1220 may reflect light incident along an x-axis direction toward a z-axis direction. The prism 1220 may comprise a mirror.

The first camera device 1000 may comprise a guide member. The guide member may guide the movement of the mover 1200 against the housing 1100. The guide member may comprise a rotation plate 1300. The rotation plate 1300 may be a 'driving plate'. The rotation plate 1300 may be disposed between the housing 1100 and the mover 1200. The rotation plate 1300 may be disposed between the housing 1100 and the mover 1200 in a third axis direction perpendicular to the first and second axes. The rotation plate 1300 may be disposed between the third magnet 1630 and the fourth magnet 1640. The rotation plate 1300 may guide the mover 1200 to be tilted about two axes against the housing 1100.

The rotation plate 1300 may comprise a base 1310. The base 1310 may have a plate shape. The base 1310 may be disposed between the mover 1200 and the housing 1100. The base 1310 may comprise a first surface facing the housing 1100 and a second surface facing the mover 1200.

The rotation plate 1300 may comprise a first protruded portion 1320. The first protruded portion 1320 may be protruded from a first surface of the base 1310. The first protruded portion 1320 may have a hemispherical shape. The first protruded portion 1320 may comprise a plurality of first protruded portions. The first protruded portion 1320 may comprise a first-first protruded portion 1321 and a first-second protruded portion 1322. The first protruded portion 1320 may comprise two first protruded portions 1321 and 1322. The two first protruded portions 1321 and 1322 may be spaced apart in a first direction. The first protruded portion 1320 may be integrally formed with the base 1310. The first protruded portion 1320 may be disposed in the groove 1121 of the housing 1100. As illustrated in FIGS. 9, 14*b*, and 14*c*, the first protruded portion 1320 may be tilted about an x-axis (first axis) while being inserted into the groove 1121 of the housing 1100.

The rotation plate 1300 may comprise a second protruded portion 1330. The second protruded portion 1330 may be protruded from a second surface at an opposite side of the first surface of the base 1310. The second protruded portion 1330 may have a hemispherical shape. The second protruded portion 1330 may be formed as a portion of the rotation plate 1300 is being bent. At this time, a groove corresponding to the second protruded portion 1330 may be formed at an opposite side of the second protruded portion 1330.

The second protruded portion 1330 may comprise a plurality of second protruded portions. The second protruded portion 1330 may comprise a second-first protruded portion 1331 and a second-second protruded portion 1332. The second protruded portion 1330 may comprise two second protruded portions 1331 and 1332. The two second protruded portions 1331 and 1332 may be spaced apart in a second direction perpendicular to the first direction. The second protruded portion 1330 may be integrally formed with the base 1310. The second protruded portion 1330 may be disposed in the groove 1214 of the mover 1200. As illustrated in FIGS. 8, 13*b* and 13*c*, the second protruded portion 1330 may be tilted about a y-axis (second axis) while being inserted into the groove 1214 of the mover 1200.

In a modified embodiment, the rotation plate 1300 may comprise a groove replacing at least one of the first protruded portion 1320 and the second protruded portion 1330. In this case, the first camera device 1000 may comprise a ball being formed separately from the rotation plate 1300 and disposed in the groove of the rotation plate 1300.

The first camera device 1000 may comprise a first driving unit 1400. The first driving unit 1400 may rotate the mover 1200 about a first axis. The first magnet 1410 and the first coil 1420 may rotate the mover 1200 about a first axis. The first magnet 1410 and the first coil 1420 may tilt the mover 1200 about a first axis. At this time, a light may be incident along a first axis.

The first driving unit 1400 may comprise a first magnet 1410. The first magnet 1410 may be disposed on both side surfaces of the mover 1200. The first magnet 1410 may comprise a magnet being formed to be a single one by bonding two-pole magnetized magnets together with an adhesive. Through this, even though the first magnet 1410 comprises four polarities, a portion having a neutral polarity can be minimized. Through this, the influence of the magnetic force of the first magnet 1410 on the second camera device 2000 can be minimized.

The first magnet 1410 may comprise a plurality of magnets. The first magnet 1410 may comprise two first magnets. The first magnet 1410 may comprise a first side magnet 1411 being disposed on one side surface of both side surfaces of the mover 1200 and a second side magnet 1412 being disposed on the other side surface of both side surfaces of the mover 1200. However, any one of the first side magnet 1411, the second side magnet 1412, and the second magnet 1510 may be referred to as a first magnet, the other one may be referred to as a second magnet, and the remaining one may be referred to as a third magnet. The first to third magnets may be 'driving magnets'.

In a second axis direction, the distance between the first magnet 1410 and the second magnet 1510 (refer to D in FIG. 10) may be smaller than ¼ of the length of the second magnet 1510 in the corresponding direction (refer to L1 in FIG. 10). Or, in a second axis direction, the distance between the first magnet 1410 and the second magnet 1510 (refer to D in FIG. 10) may be less than ⅛ of the length of the second magnet 1510 in the corresponding direction (refer to L1 in FIG. 10).

The first driving unit 1400 may comprise a first coil 1420. The first coil 1420 may be disposed in the substrate 1650. The first coil 1420 may face the first magnet 1410. The first coil 1420 may interact with the first magnet 1410 electromagnetically. As illustrated in FIGS. 14*b* and 14*c*, the first coil 1420 may be used to tilt the mover 1200 about an x-axis. When current is applied to the first coil 1420, the mover 1200 may be rotated with respect to the first protruded portion 1320 of the rotation plate 1300. As illustrated in FIG. 14*b*, when a current is applied to the first coil 1420 in a first direction, the mover 1200 may be rotated to one side about the first protruded portion 1320 of the rotation plate 1300 (refer to c in FIG. 14*b*). In addition, as illustrated in FIG. 14*c*, when a current is applied to the first coil 1420 in a second direction, which is opposite to the first direction, the mover 1200 may be rotated to the other side about the first protruded portion 1320 of the rotation plate 1300 (refer to d in FIG. 14*c*).

The first coil 1420 may comprise a plurality of first coils. The first coil 1420 may comprise two first coils 1421 and 1422. The first coil 1420 may comprise a first-first coil 1421 and a first-second coil 1422. The first-first coil 1421 may face the first side magnet 1411. The first-second coil 1422 may face the second side magnet 1412. The first-first coil 1421 and the first-second coil 1422 may be electrically separated so that they can be individually controlled. Or, the first-first coil 1421 and the first-second coil 1422 may be electrically connected.

However, in a modified embodiment, the first coil 1420 may be disposed in the mover 1200 and the first magnet 1410 may be disposed in the housing 1100.

The first camera device 1000 may comprise a Hall sensor 1430. The Hall sensor 1430 may be disposed in the substrate 1650. The Hall sensor 1430 may be disposed inside the first coil 1420. The Hall sensor 1430 may detect the first magnet 1410. The Hall sensor 1430 may detect the magnetic force of the first magnet 1410. The Hall sensor 1430 may be used to feedback the driving of the mover 1200. The Hall sensor 1430 may comprise a plurality of Hall sensors.

The first camera device 1000 may comprise a second driving unit 1500. The second driving unit 1500 may rotate the mover 1200 about a second axis perpendicular to the first axis. The second magnet 1510 and the second coil 1520 may rotate the mover 1200 about a second axis perpendicular to the first axis.

The second driving unit 1500 may comprise a second magnet 1510. The second magnet 1510 may be disposed in the yoke. The second magnet 1510 may comprise a 2-pole magnet in which the polarities of an upper surface and a lower surface are different. Or, the second magnet 1510 may comprise a 4-pole magnetized magnet having four polarities. The second magnet 1510 may be disposed in the mover 1200. The second magnet 1510 may be coupled to the mover 1200. The second magnet 1510 may be fixed to the mover 1200. The second magnet 1510 may move together with the mover 1200. The second magnet 1510 and the second coil 1520 may rotate the mover 1200 about a second axis perpendicular to the first axis. The second magnet 1510 and the second coil 1520 may tilt the mover 1200 about a second axis perpendicular to the first axis. At this time, a light may be incident along the first axis.

The second driving unit 1500 may comprise a second coil 1520. The second coil 1520 may be disposed in the substrate 1650. The second coil 1520 may face the second magnet 1510. The second coil 1520 may interact with the second magnet 1510 electromagnetically. As illustrated in FIGS. 13*b* and 13*c*, the second coil 1520 may be used to tilt the mover 1200 about a y-axis. When current is applied to the second coil 1520, the mover 1200 may be rotated with respect to the second protruded portion 1330 of the rotation plate 1300. As illustrated in FIG. 13*b*, when a current is applied to the second coil 1520 in a first direction, the mover 1200 may be rotated to one side about the second protruded portion 1330 of the rotation plate 1300 (refer to a in FIG. 13*b*). In addition, as illustrated in FIG. 13*c*, when a current is applied to the second coil 1520 in a second direction, which is opposite to the first direction, the mover 1200 may be rotated to the other side about the second protruded portion 1330 of the rotation plate 1300 (refer to d in FIG. 13*c*).

However, in a modified embodiment, the second coil 1520 may be disposed in the mover 1200 and the second magnet 1510 may be disposed in the housing 1100.

The first camera device 1000 may comprise a Hall sensor 1530. The Hall sensor 1530 may be disposed in the substrate 1650. The Hall sensor 1530 may be disposed inside the second coil 1520. The Hall sensor 1530 may detect the second magnet 1510. The Hall sensor 1530 may detect the magnetic force of the second magnet 1510. The Hall sensor 1530 may be used to feedback the driving of the mover 1200. The Hall sensor 1530 may comprise a plurality of Hall sensors.

The first camera device 1000 may comprise a first yoke 1610. The first yoke 1610 may be disposed on one surface of the second magnet 1510. Or, as a modified embodiment, the first yoke 1610 may be disposed on one side surface of the second coil 1520. The first yoke 1610 may be disposed between the second magnet 1510 and the mover 1200. The first yoke 1610 may be disposed on a first side surface of the mover 1200 between both side surfaces of the mover 1200. The first yoke 1610 may be overlapped with the mover 1200 and the second magnet 1510 in a first axis direction. In the second axis direction, the length of the first yoke 1610 (refer to L2 in FIG. 10) may be longer than the length of the second magnet 1510 (refer to L1 in FIG. 10). As a modified embodiment, in the second axis direction, the length of the first yoke 1610 may be the same as that of the second magnet 1510. In the second axis direction, the length of the first yoke 1610 (refer to L2 in FIG. 10) may be equal to the distance between the first side magnet 1411 and the second side magnet 1412. The first yoke 1610 may connect the two second yokes 1621 and 1622. However, as a modified embodiment, the first yoke 1610 may be spaced apart from the second yoke 1620. The first yoke 1610 may be formed as a separate member from the second yoke 1620. However, as a modified embodiment, the first yoke 1610 and the second yoke 1620 may be integrally formed. The first yoke 1610 may be formed of SPC or SUS 4 series material. When it is formed of SPC, plating for oxidation prevention is required, and when it is formed of SUS 4 series, plating may be unnecessary.

The length of the first yoke 1610 in a second axis direction may be 1 to 2 times the length of the second magnet 1510. The length of the first yoke 1610 in a second axis direction may be 1.2 to 1.6 times the length of the second magnet 1510. The length of the first yoke 1610 in a second axis direction may be 1.3 to 1.5 times the length of the second magnet 1510. The length of the first yoke 1610 in a second axis direction may be approximately 1.4 times the length of the second magnet 1510.

In the present embodiment, a yoke may be attached to the prism actuator of the first camera device 1000 to increase the electromagnetic force and reduce leakage magnetic flux to the outside. The attachment position of the yoke may be a surface of the magnet or a surface of the coil. According to the present embodiment, the magnetic leakage value at a contrast surface can be reduced by more than two times when there is no yoke. When applying a multi-camera device, the second camera device being disposed at a side of the first camera device 1000 applies two magnet structures in the case of an AF module, and in case of OIS module, 3 magnet structures can be applied. The yoke may be formed as large as possible so that the leakage flux of the y-axis of the yoke is minimized. The first yoke 1610 may be formed in a shape and size corresponding to the first groove 1211 of the mover 1200.

The first camera device 1000 may comprise a second yoke 1620. The second yoke 1620 may be disposed on one surface of the first magnet 1410. Or, as a modified embodiment, the second yoke 1620 may be disposed on one side surface of the first coil 1420. The second yoke 1620 may be disposed between the first magnet 1410 and the mover 1200. The second yoke 1620 may be spaced apart from the first yoke 1610. The second yoke 1620 may be connected to the first yoke 1610. The second yoke 1620 may be disposed between the first magnet 1410 and the holder 1210. The second yoke 1620 may be formed in a shape corresponding to that of the first magnet 1410. The second yoke 1620 may be formed of SPC or SUS 4 series material. When it is formed of SPC, plating for oxidation prevention is required, and when it is formed of SUS 4 series, plating may be unnecessary.

The second yoke 1620 may comprise a plurality of second yokes. The second yoke 1620 may comprise two second yokes 1621 and 1622. The second yoke 1620 may comprise a second-first yoke 1621 and a second-second yoke 1622. The second yoke 1620 may comprise two second yokes 1621 and 1622 being disposed between the two first magnets 1411 and 1412 and the mover 1200. The two second yokes may be referred to as a second yoke 1621 and a third yoke 1622.

The first camera device 1000 may comprise a third magnet 1630. The third magnet 1630 may be disposed in the mover 1200. The third magnet 1630 may be disposed on a second surface of the mover 1200. The third magnet 1630 may be fixed to the mover 1200 by an adhesive. The 'third' in the third magnet 1630 is for distinction from other magnets, and the third magnet 1630 may be called a 'fourth magnet' or the like.

The first camera device 1000 may comprise a fourth magnet 1640. The fourth magnet 1640 may be disposed in the housing 1100 so that an attractive force act with the third magnet 1630. The fourth magnet 1640 may be disposed on the side wall portion 1120 of the housing 1100. As a modified embodiment, the fourth magnet 1640 may be disposed in the second cover member 1670. The fourth magnet 1640 may comprise a second surface facing a first surface of the third magnet 1630. The second surface of the fourth magnet 1640 may have a polarity different from that of the first surface of the third magnet 1630. Through this, an attractive force may act between the third magnet 1630 and the fourth magnet 1640. The mover 1200 may press the rotation plate 1300 toward the side wall portion 1120 of the housing 1100 by the force of the third magnet 1630 being pulled toward the fourth magnet 1640. Through this, even when the mover 1200 moves, the contact state of the mover 1200, the rotation plate 1300, and the housing 1100 can be maintained. The 'fourth' in the fourth magnet 1640 is for distinction from other magnets, and the fourth magnet 1640 may be called a 'fifth magnet' or the like. The fourth and fifth magnets may be 'magnets for an attractive force'.

The first camera device 1000 may comprise a substrate 1650. The substrate 1650 may comprise a flexible printed circuit board (FPCB). The substrate 1650 may be electrically connected to the printed circuit board 1740. The substrate 1650 may provide current to the first coil 1420, the second coil 1430, and the Hall sensors 1430 and 1530.

The first camera device 1000 may comprise a first cover member 1660. The first cover member 1660 may be a 'cover can' or a 'shield can'. The first cover member 1660 may be disposed outside the housing 1100. The first cover member 1660 may cover the housing 1100. The first cover member 1660 may accommodate the mover 1200. The first cover member 1660 may be formed of a metal material. The first cover member 1660 may block electromagnetic interference (EMI). The first cover member 1660 may comprise an upper plate and side plates being extended downward from the upper plate.

The first camera device 1000 may comprise a second cover member 1670. The second cover member 1670 may be a 'cover can' or a 'shield can'. The second cover member 1670 may be disposed to cover the side plate of the first cover member 1660. However, in a modified embodiment, the first cover member 1660 may cover the second cover member 1670. The second cover member 1670 may be disposed outside the housing 1100. The second cover member 1670 may cover the housing 1100. The second cover member 1670 may be formed of a metal material. The second cover member 1670 may block electromagnetic interference (EMI). The second cover member 1670 may comprise a plurality of side plates.

The first camera device 1000 may comprise a lens actuator. The lens actuator may move the lens 1710 in a third axis direction (z axis) perpendicular to the first axis (x axis) and the second axis (y axis). The lens actuator may move the lens 1710 in an optical axis direction of the image sensor 1730. Through this, the lens actuator may perform any one or more of autofocus (AF) and a zoom functions. The lens actuator may move only some of the plurality of lenses. Or, the lens actuator may divide the plurality of lenses into a plurality of groups and individually move them for each of the plurality of groups.

The first camera device 1000 may comprise a mover 1810. The mover 1810 may be disposed inside the cover member 1850. The mover 1810 may be movably disposed inside the cover member 1850. The mover 1810 may be coupled to the lens 1710. The mover 1810 may be supported elastically by an elastic member 1870.

The first camera device 1000 may comprise a magnet 1820. The magnet 1820 may be disposed on an outer circumferential surface of the mover 1810. The magnet 1820 may comprise a surface facing the coil 1840. The magnet 1820 may comprise a plurality of magnets. The magnet 1820 may comprise two magnets.

The first camera device 1000 may comprise a second substrate 1830. The second substrate 1830 may be disposed inside the cover member 1850. The second substrate 1830 may be electrically connected to the substrate 1650. The second board 1830 may electrically connect the board 1650 and the printed circuit board 1740. The second substrate 1830 may comprise FPCB.

The first camera device 1000 may comprise a coil 1840. The coil 1840 may be disposed in the second substrate 1830. The coil 1840 may be disposed to face the magnet 1820. The coil 1840 may face the magnet 1820. The coil 1840 may interact electromagnetically with magnet 1820. When a current is applied to the coil 1840, an electromagnetic field may be formed around the coil 1840. Through this, the magnet 1820 may move. At this time, the magnet 1820 may move together with the mover 1810. When a current is applied to the coil 1840 in a first direction, the mover 1810 may move in a direction away from the image sensor 1730. When a second direction opposite to the first direction is applied to the coil 1840, the mover 1810 may move in a direction being closer to the image sensor 1730.

The first camera device 1000 may comprise a Hall sensor. The Hall sensor may be disposed at a position corresponding to the magnet 1820. The Hall sensor may detect the position of the mover 1810 by detecting the magnetic force of the magnet 1820. The Hall sensor may be disposed in the second substrate 1830. The Hall sensor may be disposed inside the coil 1840. The Hall sensor may be used for feedback of one or more of an auto focus function and a zoom function.

The first camera device 1000 may comprise a cover member 1850. The cover member 1850 may be a 'cover can' or a 'shield can'. The cover member 1850 may be disposed outside the mover 1810. The cover member 1850 may be formed of a metal material. The cover member 1850 may block electromagnetic interference (EMI). The cover member 1850 may comprise a first plate comprising a surface facing forward, and a second plate being extended in an optical axis direction from the first plate.

The first camera device 1000 may comprise a base 1860. The base 1860 may be disposed in a direction from the mover 1810 toward the image sensor 1730. The base 1860 may function as a stopper toward one side of the mover 1810. The base 1860 may be coupled with the cover member 1850.

The first camera device 1000 may comprise an elastic member 1870. The elastic member 1870 may be coupled to the mover 1810. The elastic member 1870 may elastically guide the movement of the mover 1810. At least a portion of the elastic member 1870 may have elasticity. When a current is applied to the coil 1840 and the mover 1810 moves, at least a portion of the elastic member 1870 may be deformed. Thereafter, when the current applied to the coil 1840 is stopped, the elastic member 1870 may be restored by the elastic force of the elastic member 1870. At this time, the mover 1810 may also move to the initial position. The elastic member 1870 may be formed of metal. The elastic member 1870 may be formed of a leaf spring.

The elastic member 1870 may comprise a first elastic member 1871. The first elastic member 1871 may be coupled to the mover 1810. The first elastic member 1871 may be disposed in front of the second elastic member 1872. The first elastic member 1871 may comprise two elastic units spaced apart from each other. The first elastic member 1871 may be used as a conductive line for supplying electricity.

The elastic member 1870 may comprise a second elastic member 1872. The second elastic member 1872 may connect the mover 1810 and the base 1860. The second elastic member 1872 may be disposed at a rear side of the first elastic member 1871. The second elastic member 1872 may comprise an outer side portion being coupled to the base 1860, an inner side portion being coupled to the mover 1810, and a connection portion for connecting the outer side portion and the inner side portion.

The first camera device 1000 according to the present embodiment may comprise: a first housing; a first mover being disposed in the first housing; and a first unit comprising a yoke being disposed between the first mover and the first housing. At this time, the first housing may be the housing 1100, and the first mover may be the mover 1200. The first camera device 1000 may comprise: a second housing; a second unit comprising a second mover being disposed in the second housing. The first unit may perform a handshake correction function. The second unit may perform a focusing function. The first mover may comprise a first surface and a second surface being disposed in a direction perpendicular to the first surface. The yoke of the first unit may comprise: a first yoke 1610 disposed between the first surface of the first mover and the first housing; a second yoke 1620 being disposed between the second surface of the first mover and the first housing.

The first yoke 1610 and the second yoke 1620 may be disposed parallel to the moving direction of the second mover. A first mover, a first yoke 1610, a second magnet 1510, and a second coil 1520 may be sequentially disposed along a first axis. The first yoke 1610 may have an upper surface or a lower surface perpendicular to the first axis. At least a portion of the first yoke 1610 may be overlapped with the first magnet 1410 in a third axis direction.

The driving plate may be disposed between the first housing and the first mover. The driving plate may be disposed between the first housing and the first mover in a third axis direction. The first mover may comprise a reflective member. The reflective member may comprise a prism 1220. Light may be incident on the reflective member along a first axis. The reflective member may reflect light to a lens module being coupled to the second mover. The reflective member may bend or refract light to a lens module being coupled to the second mover.

The second yoke 1620 may be disposed between the first magnet 1410 and the first mover. In a second axis direction, the length of the first yoke 1610 may be longer than that of the second magnet 1510. The area of the first yoke 1610 may be larger than that of the second magnet 1510. The length of the long axis of the first yoke 1610 may be greater than the length of the long axis of the second magnet 1510. The area of one surface of the first yoke 1610 may be larger than the area of one surface of the second magnet 1510 facing the first yoke 1610. The second yoke 1620 may comprise two second yokes being disposed at an opposite side of the first mover. At this time, the first yoke 1610 and the two second yokes may form a 'c' shape.

Hereinafter, a second camera device according to present embodiment will be described with reference to drawings.

Figure 16:
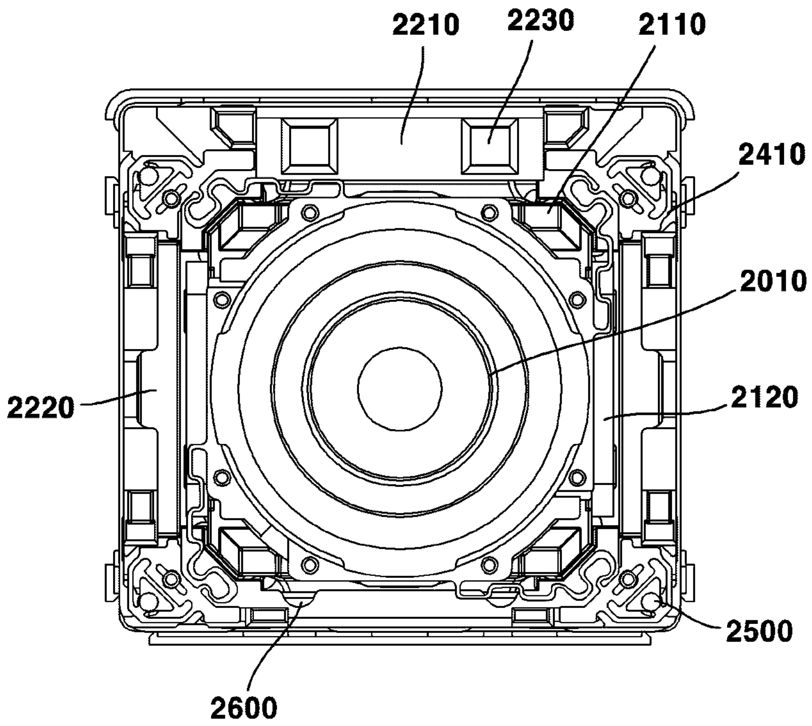
FIG. 16 is a plan view of a state in which a cover member is omitted in a second camera device according to a present embodiment.
Figure 17:
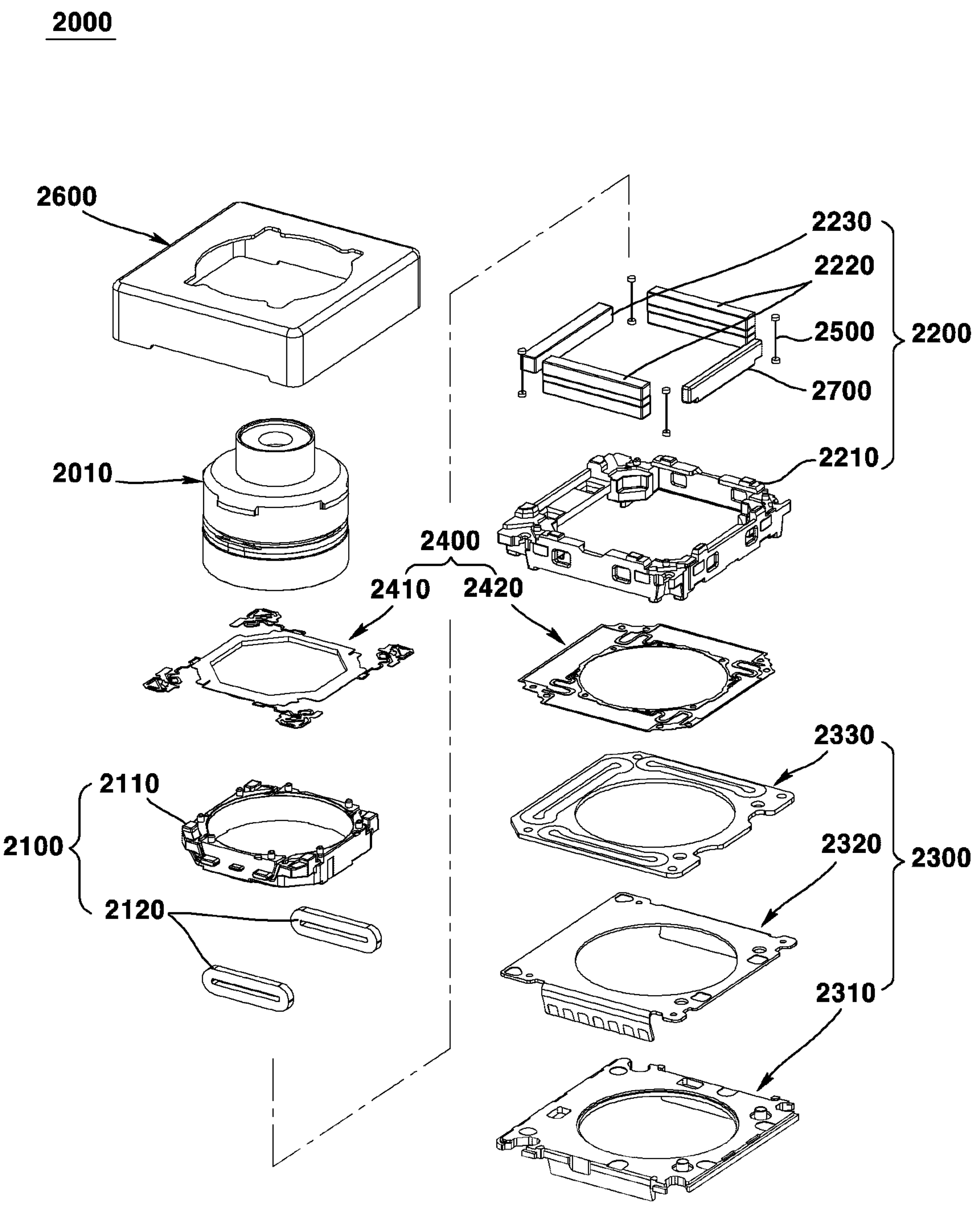
FIG. 17 is an exploded perspective view of a second camera device according to present embodiment.
Figure 18:
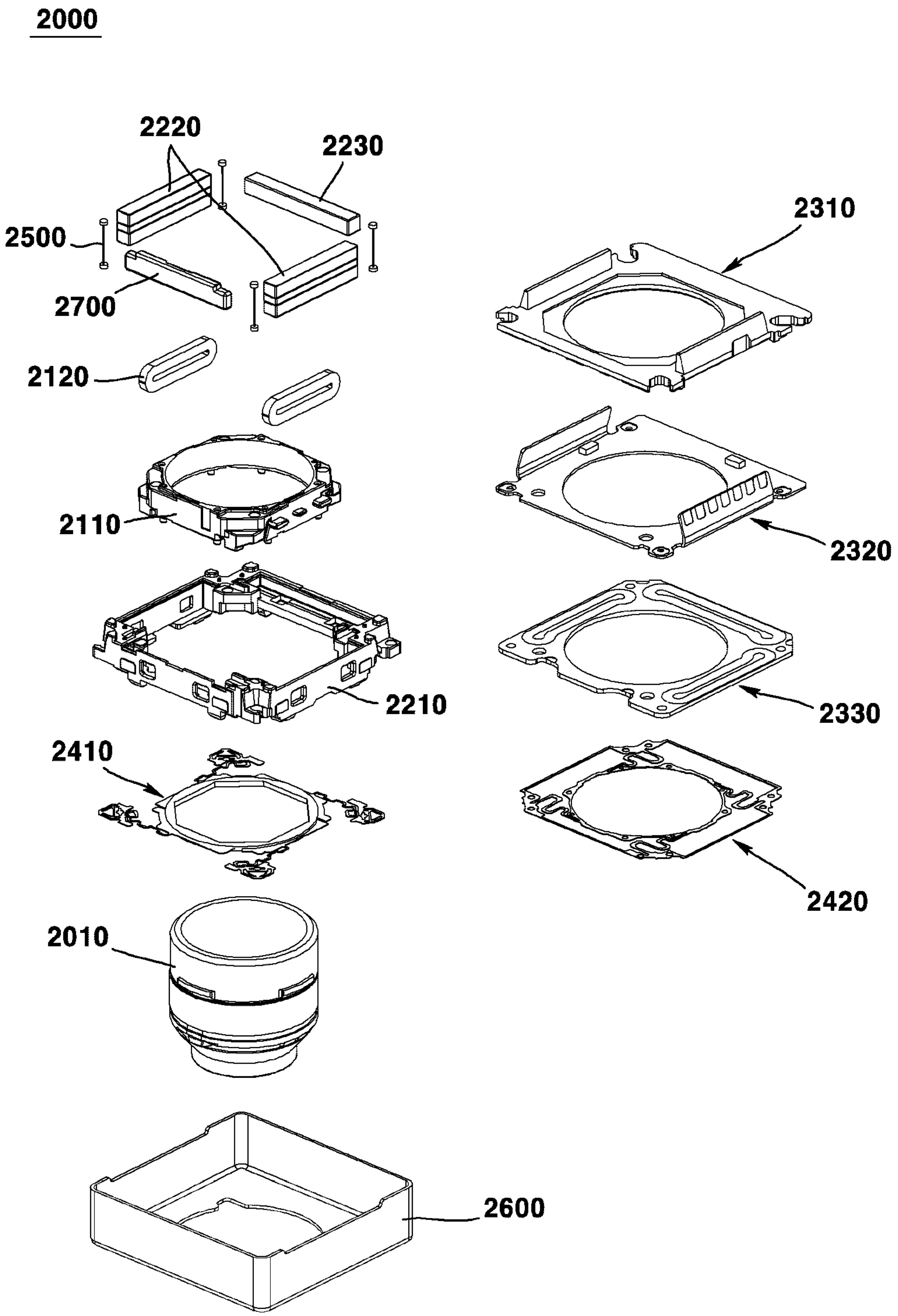
FIG. 18 is an exploded perspective view of a second camera device viewed from a direction different from that of FIG. 4.
Figure 19:
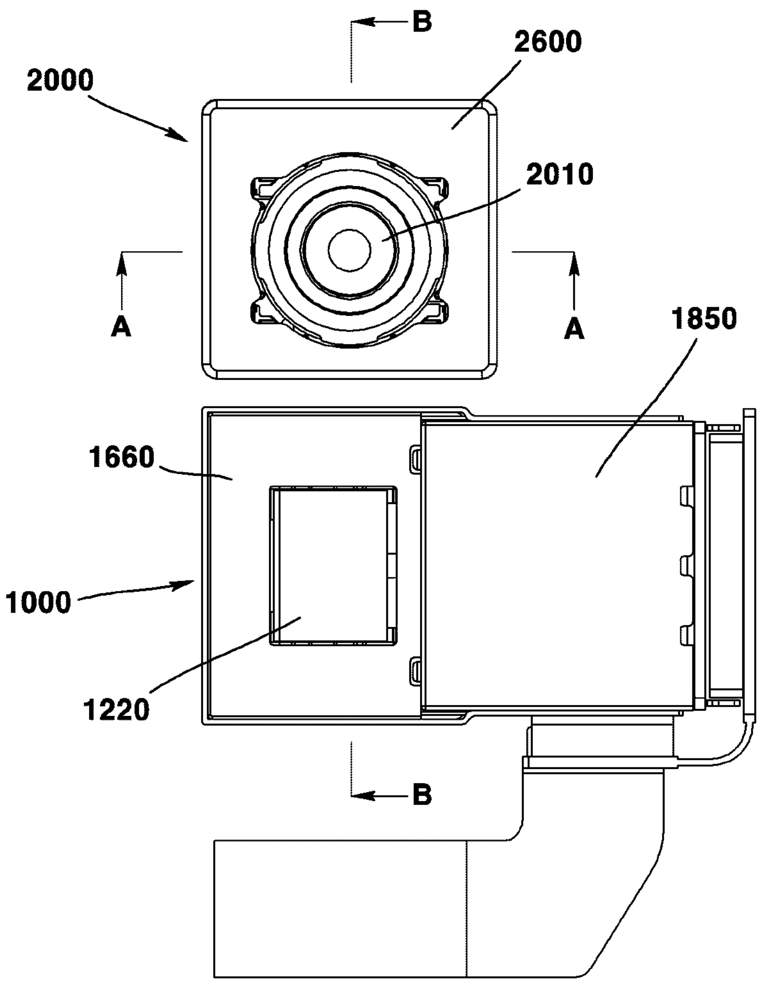
FIG. 19 is a plan view of a camera device according to a present embodiment.
Figure 20:
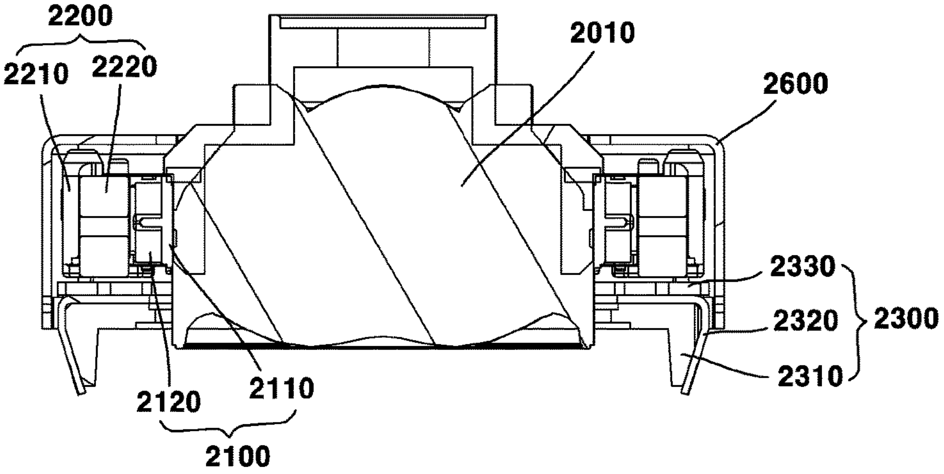
FIG. 20 is a cross-sectional view viewed from A-A of FIG. 19.
Figure 21:
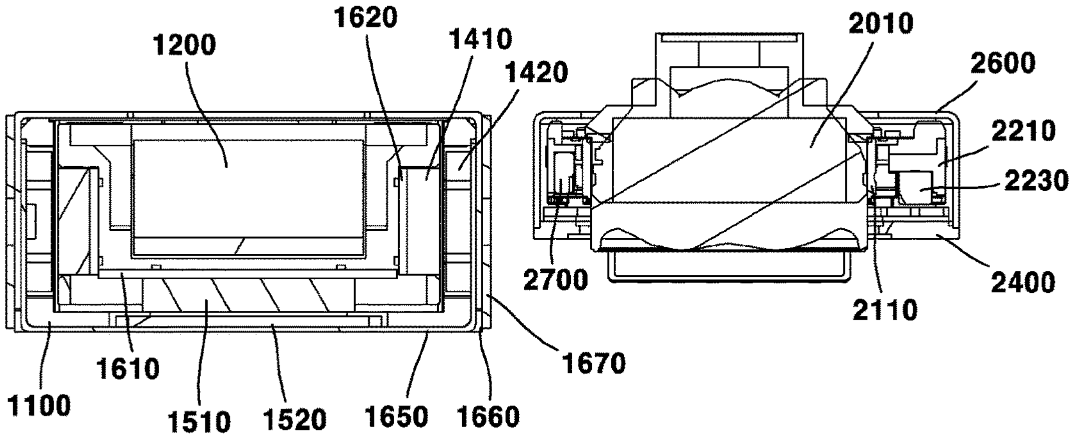
FIG. 21 is a cross-sectional view viewed from line B-B of FIG. 19.

FIG. 16 is a plan view of a state in which a cover member is omitted in a second camera device according to a present embodiment; FIG. 17 is an exploded perspective view of a second camera device according to present embodiment; FIG. 18 is an exploded perspective view of a second camera device viewed from a direction different from that of FIG. 4; FIG. 19 is a plan view of a camera device according to a present embodiment; FIG. 20 is a cross-sectional view viewed from A-A of FIG. 19; and FIG. 21 is a cross-sectional view viewed from line B-B of FIG. 19.

The second camera device 2000 may comprise a lens module. The lens module may comprise at least one lens 2010. The lens 2010 may be coupled to a lens driving device and face a first axis direction. The lens 2010 may be disposed at a position corresponding to an image sensor. The lens module may comprise a lens 2010 and a barrel. The lens module may be coupled to the bobbin 2110 of the lens driving device. The lens module may be coupled to the bobbin 2110 by screw-coupling and/or adhesive. The lens module may move integrally with the bobbin 2110.

The second camera device 2000 may comprise a filter. The filter may serve to block light of a specific frequency band from entering the image sensor from light passing through the lens module. The filter may be disposed parallel to an x-y plane. The filter may be disposed between the lens module and the image sensor. The filter may be disposed in the sensor base. In a modified embodiment, a filter may be disposed in the base 2310. The filter may comprise an infrared filter. The infrared filter may block light in the infrared region from being incident on the image sensor.

The second camera device 2000 may comprise a sensor base. The sensor base may be disposed between the lens driving device and the printed circuit board. The sensor base may comprise a protruded portion in which a filter is disposed. An opening may be formed in a portion of the sensor base where the filter is disposed so that a light passing through the filter may be incident to the image sensor. The adhesive member may couple or attach the base 2310 of the lens driving device to the sensor base. The adhesive member may additionally serve to prevent foreign substances from entering the lens driving device. The adhesive member may comprise any one or more among an epoxy, a thermosetting adhesive, and an ultraviolet curable adhesive.

The second camera device 2000 may comprise a printed circuit board (PCB). A printed circuit board may be a substrate or a circuit board. A lens driving device may be disposed in the printed circuit board. A sensor base may be disposed between the printed circuit board and the lens driving device. The printed circuit board may be electrically connected to the lens driving device. An image sensor may be disposed in the printed circuit board. Various circuits, elements, control units, and the like may be provided in the printed circuit board to convert an image being formed by an image sensor into an electrical signal and transmit the electrical signal to an external device.

The second camera device 2000 may comprise an image sensor. The image sensor may be a configuration on which a light passing through a lens and a filter is incident to form an image. The image sensor may be mounted on a printed circuit board. The image sensor may be electrically connected to the printed circuit board. For example, the image sensor may be coupled to a printed circuit board by surface mounting technology (SMT). As another example, the image sensor may be coupled to a printed circuit board by flip chip technology. The image sensor may be disposed such that an optical axis coincides with a lens. That is, the optical axis of the image sensor and the optical axis of the lens may be aligned. The image sensor may convert light irradiated onto an effective image area of the image sensor into an electrical signal. The image sensor may be any one among a charge coupled device (CCD), a metal oxide semi-conductor (MOS), a CPD, and a CID.

The second camera device 2000 may comprise a motion sensor. The motion sensor may be mounted on a printed circuit board. The motion sensor may be electrically connected to the control unit through a circuit pattern provided on the printed circuit board. The motion sensor may output rotational angular velocity information due to the movement of the second camera device 2000. The motion sensor may comprise a 2-axis or 3-axis gyro sensor or an angular velocity sensor.

The second camera device 2000 may comprise a control unit. The control unit may be disposed in a printed circuit board. The control unit may be electrically connected to a first coil and a second coil 2120 and 2330 of the lens driving device. The control unit may individually control the direction, intensity, and amplitude of the current being supplied to the first coil and the second coil 2120 and 2330. The control unit may perform an autofocus function and/or a handshake correction function by controlling the lens driving device. Furthermore, the control unit may perform autofocus feedback control and/or handshake correction feedback control for the lens driving device.

The second camera device 2000 may comprise a connector. The connector may be electrically connected to the printed circuit board. The connector may comprise a port for electrically connecting with an external device.

The second camera device may comprise a lens driving device. The lens driving device may be a voice coil motor (VCM). The lens driving device may be a lens driving motor. The lens driving device may be a lens driving actuator. The lens driving device may comprise an AF module. The lens driving device may comprise an OIS module. The lens driving device may be disposed adjacent to the first magnet 1410 of the first camera device 1000.

The lens driving device may comprise a first mover 2100. The first mover 2100 may be coupled with a lens. The first mover 2100 may be connected to the second mover 2200 through an upper elastic member 2410 and/or a lower elastic member 2420. The first mover 2100 may move through interaction with the second mover 2200. At this time, the first mover 2100 may move integrally with the lens. Meanwhile, the first mover 2100 may move during AF driving. At this time, the first mover 2100 may be referred to as an 'AF mover'. However, the first mover 2100 may move together with the second mover 2200 even during OIS driving.

The first mover 2100 may comprise a bobbin 2110. The bobbin 2110 may be disposed inside the housing 2210. The bobbin 2110 may be disposed in a hole of the housing 2210. The bobbin 2110 may be movably coupled to the housing 2210. The bobbin 2110 may move in an optical axis direction against the housing 2210. A lens may be coupled to the bobbin 2110. The bobbin 2110 and the lens may be coupled by screw-coupling and/or an adhesive. The first coil 2120 may be coupled to the bobbin 2110. An upper elastic member 2410 may be coupled to an upper portion or upper surface of the bobbin 2110. A lower elastic member 2420 may be coupled to a lower portion or a lower surface of the bobbin 2110. The bobbin 2110 may be coupled to the upper elastic member 2410 and/or the lower elastic member 2420 by thermal fusion and/or an adhesive. An adhesive for coupling the bobbin 2110 and the lens, and the bobbin 2110 and the elastic member 2400 may be an epoxy cured by at least one among ultraviolet (UV) light, heat, and laser.

The first mover 2100 may comprise a first coil 2120. The first coil 2120 may be an 'AF driving coil' used for AF driving. The first coil 2120 may be disposed in the bobbin 2110. The first coil 2120 may be disposed between the bobbin 2110 and the housing 2210. The first coil 2120 may be disposed on an outer lateral surface or an outer peripheral surface of the bobbin 2110. The first coil 2120 may be directly wound on the bobbin 2110. Or, the first coil 2120 may be coupled to the bobbin 2110 in a state being directly wound thereon. The first coil 2120 may face the first magnet 2220. The first coil 2120 may be disposed to face the first magnet 2220. The first coil 2120 may interact with the first magnet 2220 electromagnetically. In this case, when a current is supplied to the first coil 2120 and an electromagnetic field is formed around the first coil 2120, the first coil 2120 may move against the first magnet 2220 due to the electromagnetic interaction between the first coil 2120 and the first magnet 2220. The first coil 2120 may be formed as a single coil. Or, the first coil 2120 may comprise a plurality of coils being spaced apart from each other. The first coil 2120 may be electrically connected to the upper elastic member 2410. As a modified embodiment, the first coil 2120 may be electrically connected to the lower elastic member 2420.

The lens driving device may comprise a second mover 2200. The second mover 2200 may be movably coupled to the stator 2300 through the support member 2500. The second mover 2200 may support the first mover 2100 through the upper and lower elastic members 2410 and 2420. The second mover 2200 may move the first mover 2100 or may move together with the first mover 2100. The second mover 2200 may move through interaction with the stator 2300. The second mover 2200 may move during OIS driving. At this time, the second mover 2200 may be referred to as 'OIS mover'. The second mover 2200 may move integrally with the first mover 2100 during OIS driving.

The second mover 2200 may comprise a housing 2210. The housing 2210 may be spaced apart from the base 2310. The housing 2210 may be disposed outside the bobbin 2110. The housing 2210 may accommodate at least a portion of the bobbin 2110. The housing 2210 may be disposed inside the cover member 2600. The housing 2210 may be disposed between the cover member 2600 and the bobbin 2110. The housing 2210 may be formed of a material different from that of the cover member 2600. The housing 2210 may be formed of an insulating material. The housing 2210 may be formed of an injection molding material. An outer side surface of the housing 2210 may be spaced apart from an inner surface of the side plate of the cover member 2600. Through the separation space between the housing 2210 and the cover member 2600, the housing 2210 may move for OIS driving.

A first magnet 2220 may be disposed in the housing 2210. The housing 2210 and the first magnet 2220 may be coupled by an adhesive. A second magnet 2230 may be disposed in the housing 2210. The housing 2210 and the second magnet 2230 may be coupled by an adhesive. A dummy member 2700 may be disposed in the housing 2210. The housing 2210 and the dummy member 2700 may be coupled by an adhesive. An upper elastic member 2410 may be coupled to an upper portion or an upper surface of the housing 2210. A lower elastic member 2420 may be coupled to a lower portion or lower surface of the housing 2210. The housing 2210 may be coupled to upper and lower elastic members 510 and 520 by thermal fusion and/or an adhesive. The adhesive that couples the housing 2210 and the first magnet 2220 and the housing 2210 and the elastic member 2400 may be an epoxy cured by at least one among ultraviolet (UV), heat, and laser.

The housing 2210 may comprise four side portions and four corner portions being disposed between the four side portions. The side portion of the housing 2210 may comprise a first side portion, a second side portion being disposed at an opposite side of the first side portion, and a third side portion and a fourth side portion being disposed at an opposite side to each other between the first side portion and the second side portion. The corner portion of the housing 2210 may comprise: a first corner portion being disposed between the first side portion and the third side portion; a second corner portion being disposed between the first side portion and the fourth side portion; a third corner portion being disposed between the second side portion and the third side portion; and a fourth corner portion disposed between the second side portion and the fourth side portion. A side portion of the housing 2210 may comprise a 'lateral wall'.

The second mover 2200 may comprise a first magnet 2220. The first magnet 2220 may be disposed in the housing 2210. The first magnet 2220 may be fixed to the housing 2210 by an adhesive. The first magnet 2220 may be disposed between the bobbin 2110 and the housing 2210. The first magnet 2220 may face the first coil 2120. The first magnet 2220 may interact with the first coil 2120 electromagnetically. The first magnet 2220 may face the second coil 2330. The first magnet 2220 may interact with the second coil 2330 electromagnetically. The first magnet 2220 may be commonly used for AF driving and OIS driving. The first magnet 2220 may be disposed at a side portion of the housing 2210. At this time, the first magnet 2220 may be a flat magnet having a flat plate shape. As a modified embodiment, the first magnet 2220 may be disposed at a corner portion of the housing 2210. At this time, the first magnet 2220 may be a corner magnet having a hexahedral shape with an inner side surface wider than an outer side surface. The first magnet 2220 may comprise a plurality of magnets. The first magnet 2220 may comprise two magnets.

The second mover 2200 may comprise a second magnet 2230. The second magnet 2230 may be disposed in the housing 2210. The second magnet 2230 may be fixed to the housing 2210 by an adhesive. The second magnet 2230 may be disposed between the bobbin 2110 and the housing 2210. The second magnet 2230 may face the second coil 2330. The second magnet 2230 may interact with the second coil 2330 electromagnetically. The second magnet 2230 may be used for OIS driving. The first magnet 2220 is used to move the second mover 2200 in an OIS-x direction (first axis direction), and the second magnet 2230 may be used to move the second mover 2200 in an OIS-y direction (second axis direction). The second magnet 2230 may be configured with a single magnet. As a modified embodiment, the second magnet 2230 may comprise a plurality of magnets.

The lens driving device may comprise a stator 2300. The stator 2300 may be disposed below the first and second movers 2100 and 2200. The stator 2300 may movably support the second mover 2200. The stator 2300 may move the second mover 2200. At this time, the first mover 2100 may also move together with the second mover 2200.

The stator 2300 may comprise a base 2310. The base 2310 may be disposed below the housing 2210. The base 2310 may be disposed below a substrate 2320. The substrate 2320 may be disposed on an upper surface of the base 2310. The base 2310 may be coupled to the cover member 2600. The base 2310 may be disposed above the printed circuit board.

The stator 2300 may comprise a substrate 2320. The substrate 2320 may be disposed between the base 2310 and the housing 2210. The substrate 2320 may be disposed on an upper surface of the base 2310. The substrate 2320 may comprise a second coil 2330 facing the first magnet 2220 and the second magnet 2230. The substrate 2320 may supply power to the second coil 2330. A support member 2500 may be coupled to the substrate 2320. The board 2320 may be coupled to the printed circuit board being disposed below the base 2310 by soldering. The substrate 2320 may comprise a flexible printed circuit board (FPCB). The substrate 2320 may be partially bent.

The substrate 2320 may comprise a body unit. A hole may be formed in the body unit. The substrate 2320 may comprise a terminal unit. The terminal unit may be extended downward from the body unit of the substrate 2320. The terminal unit may be formed as a portion of the substrate 2320 is being bent. At least a portion of the terminal unit may be exposed to the outside. The terminal unit may be coupled to the printed circuit board being disposed below the base 2310 by soldering. The terminal unit may be disposed in the groove of the base 2310. The terminal unit may comprise a plurality of terminals.

The stator 2300 may comprise a second coil 2330. The second coil 2330 may be one configuration of the substrate 2320, but it may be a separate configuration from the substrate 2320. The second coil 2330 may interact with the first magnet 2220 and the second magnet 2230 electromagnetically. In this case, when a current is supplied to the second coil 2330 and a magnetic field is formed around the second coil 2330, the first magnet 2220 may move in a first axis direction against the second coil 2330 by the electromagnetic interaction between the second coil 2330 and the first magnet 2220. When a current is supplied to the second coil 2330 and a magnetic field is formed around the second coil 2330, the second magnet 2230 may move in a second axis direction against the second coil 2330 by the electromagnetic interaction between the second coil 2330 and the second magnet 2230. The second coil 2330 may move the housing 2210 and bobbin 2110 in a direction perpendicular to the optical axis against the base 2310 through electromagnetic interaction with the first magnet 2220 and the second magnet 2230. The second coil 2330 may be a fine pattern coil (FP coil) being integrally formed with the body unit.

The second coil 2330 may comprise a second-first coil that moves the housing 2210 and the bobbin 2110 in a first direction perpendicular to the optical axis direction. The second coil 2330 may comprise a second-second coil that moves the housing 2210 and the bobbin 2110 in an optical axis direction and in a second direction perpendicular to the first direction. At this time, the second-first coil may be formed as a single coil and the second-second coil may be formed as two coils being disposed at an opposite side to each other. Or, conversely, the second-first coil may be formed of two coils being disposed at an opposite side to each other and the second-second coil may be formed of a single coil.

The lens driving device may comprise an elastic member 2400. At least portion of the elastic member 2400 may have elasticity. The elastic member 2400 may be formed of metal. The elastic member 2400 may be formed of a conductive material. The elastic member 2400 may be coupled to the bobbin 2110 and the housing 2210. The elastic member 2400 may elastically support the bobbin 2110. The elastic member 2400 may movably support the bobbin 2110. The elastic member 2400 may support the movement of the bobbin 2110 during AF driving. That is, the elastic member 2400 may comprise an 'AF support member'. The elastic member 2400 may movably support the housing 2210. That is, the elastic member 2400 may comprise an 'OIS support member'.

The elastic member 2400 may comprise an upper elastic member 2410. The upper elastic member 2410 may connect the housing 2210 and the bobbin 2110. The upper elastic member 2410 may be coupled to an upper portion of the bobbin 2110 and an upper portion of the housing 2210. The upper elastic member 2410 may be coupled to an upper surface of the bobbin 2110. The upper elastic member 2410 may be coupled to an upper surface of the housing 2210. The upper elastic member 2410 may be coupled to the support member 2500. The upper elastic member 2410 may be formed of a leaf spring.

The upper elastic member 2410 may comprise a plurality of upper elastic units. The upper elastic member 2410 may comprise four upper elastic units. The upper elastic member 2410 may comprise first to fourth upper elastic units. The first to fourth upper elastic units may connect four wires to the four upper terminals 641 of the second substrate 640. Each of the four upper elastic units may comprise a body unit being coupled to the housing 2210 and a connection terminal being connected to a terminal of the second substrate 640.

The upper elastic member 2410 may comprise an inner side portion. The inner side portion may be coupled to the bobbin 2110. The inner side portion may be coupled to an upper surface of the bobbin 2110. The inner side portion may comprise a hole or groove being coupled to a protruded portion of the bobbin 2110. The inner side portion may be fixed to the bobbin 2110 by an adhesive.

The upper elastic member 2410 may comprise an outer side portion. The outer side portion may be coupled to the housing 2210. The outer side portion may be coupled to an upper surface of the housing 2210. The outer side portion may comprise a hole or groove being coupled to a protrusion of the housing 2210. The outer side portion may be fixed to the housing 2210 by an adhesive.

The upper elastic member 2410 may comprise a connection portion. The connection portion may connect an inner side portion and an outer side portion. The connection portion may have elasticity. At this time, the connection portion may be referred to as an 'elastic portion'. The connection portion may be formed by bending two or more times.

The upper elastic member 2410 may comprise a coupling portion. The coupling portion may be extended from an outer side portion. The coupling portion may be coupled to the support member 2500. The coupling portion may comprise a hole through which a wire of the support member 2500 passes. The coupling portion and the wire may be coupled by soldering.

The elastic member 2400 may comprise a lower elastic member 2420. The lower elastic member 2420 may be disposed below the upper elastic member 2410. The lower elastic member 2420 may connect the bobbin 2110 and the housing 2210. The lower elastic member 2420 may be disposed below the bobbin 2110. The lower elastic member 2420 may be coupled to the bobbin 2110 and the housing 2210. The lower elastic member 2420 may be coupled to a lower surface of the bobbin 2110. The lower elastic member

2420 may be coupled to a lower surface of the housing 2210. The lower elastic member 2420 may be formed of a leaf spring.

The lower elastic member 2420 may comprise an inner side portion. The inner side portion may be coupled to the bobbin 2110. The inner side portion may be coupled to a lower surface of the bobbin 2110. The inner side portion may comprise a hole or groove being coupled to a protrusion of the bobbin 2110. The inner side portion may be fixed to the bobbin 2110 by an adhesive.

The lower elastic member 2420 may comprise an outer side portion. The outer side portion may be coupled to the housing 2210. The outer side portion may be coupled to a lower surface of the housing 2210. The outer side portion may comprise a hole or groove coupled to a protrusion of the housing 2210. The outer side portion may be fixed to the housing 2210 by an adhesive.

The lower elastic member 2420 may comprise a connection portion. The connection portion may connect an inner side portion and an outer side portion. The connection portion may have elasticity. At this time, the connection portion may be referred to as an 'elastic portion'. The connection portion may be formed by being bent two or more times.

The elastic member 2400 may comprise a support member 2500. The support member 2500 may connect the substrate 2320 and the upper elastic member 2410. The support member 2500 may be coupled to each of the upper elastic member 2410 and the substrate 2320 by soldering. The support member 2500 may movably support the housing 2210. The support member 2500 may elastically support the housing 2210. At least portion of the support member 2500 may have elasticity. The support member 2500 may support the movement of the housing 2210 and the bobbin 2110 during OIS driving. At this time, the support member 2500 may be referred to as an 'OIS support member'. The support member 2500 may comprise an elastic member. The support member 2500 may be formed of a wire. As a modified example, the support member 2500 may be formed of a leaf spring.

The support member 2500 may comprise a wire. The support member 2500 may comprise a wire spring. The support member 2500 may comprise a plurality of wires. The support member 2500 may comprise four wires being connected in pairs to the four upper elastic units. The support member 2500 may comprise first to fourth wires.

The lens driving device may comprise a cover member 2600. The cover member 2600 may comprise a 'cover can'. The cover member 2600 may be disposed outside the housing 2210. The cover member 2600 may be coupled to the base 2310. The cover member 2600 may accommodate the housing 2210 therein. The cover member 2600 may form the outer appearance of the lens driving device. The cover member 2600 may have a hexahedral shape with an open lower surface. The cover member 2600 may be a non-magnetic material. The cover member 2600 may be formed of a metal material. The cover member 2600 may be formed of a metal plate material. The cover member 2600 may be connected to the ground portion of the printed circuit board. Through this, the cover member 2600 may be grounded. The cover member 2600 may block electromagnetic interference (EMI). At this time, the cover member 2600 may be referred to as an 'EMI shield can'.

The cover member 2600 may comprise an upper plate and a side plate. The cover member 2600 may comprise an upper plate comprising a hole and a side plate being extended downward from an outer periphery or edge of the upper plate. A lower end of the side plate of the cover member 2600 may be disposed on a step portion of the base 2310. An inner surface of the side plate of the cover member 2600 may be fixed to the base 2310 by an adhesive.

The lens driving device may comprise a dummy member 2600. The dummy member 2600 may be disposed in the housing 2210. The dummy member 2600 may not have magnetic force. The magnetic force of the dummy member 2600 may be weaker than that of the second magnet 2230. The dummy member 2600 may be disposed adjacent to the first camera device 1000. The dummy member 2600 may have the same weight as the second magnet 2230. The dummy member 2600 may be disposed to minimize magnetic force interference with the first camera device 1000. Magnetic force interference between the first camera device 1000 and the second camera device 2000 can be minimized by the dummy member 2600.

The lens driving device may comprise an OIS sensor. The OIS sensor can be used for OIS feedback control. At this time, the OIS sensor may be referred to as a 'sensor for driving OIS feedback'. The OIS sensor may be disposed between the base 2310 and the substrate 2320. The OIS sensor may detect the movement of the second mover 2200. The OIS sensor may comprise a Hall sensor. At this time, the Hall sensor may detect the movement of the housing 2210 by detecting the magnetic force of one or more of the first magnet 2220 and the second magnet 2230. A detection value detected by the OIS sensor may be used for OIS feedback control.

Hereinafter, an optical instrument according to a present embodiment will be described with reference to drawings.

Figure 22:
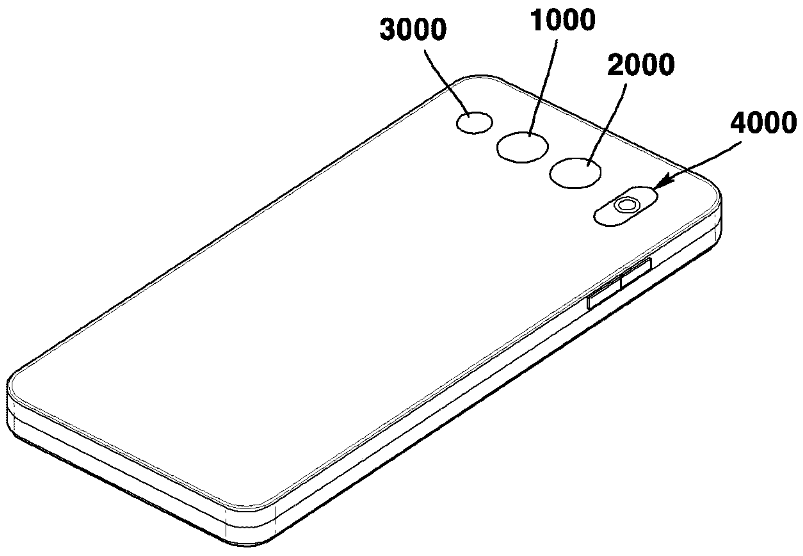
FIG. 22 is a perspective view of an optical instrument according to a present embodiment.

FIG. 22 is a perspective view of an optical instrument according to a present embodiment.

The optical instrument may comprise any one or more among: a hand phone, a mobile phone, a portable terminal, a mobile terminal, a smart phone, a smart pad, a portable smart device, a digital camera, a laptop computer, a digital broadcasting terminal, a personal digital assistant (PDA), a portable multimedia player (PMP), and navigation. However, an optical instrument may comprise any device for photographing a video or a photo.

The optical instrument may comprise a main body. The optical instrument may comprise camera devices 1000 and 2000. The camera devices 1000 and 2000 may be disposed in the main body. The camera devices 1000 and 2000 may photograph a subject. An optical instrument may comprise a display. The display can be placed on the main body. The display may output an image photographed by the camera devices 1000 and 2000. The display may be disposed on a first surface of the main body. The camera devices 1000 and 2000 may be disposed on one or more of a first surface of the main body and a second surface at an opposite side of the first surface.

The optical instrument may comprise camera devices 1000 and 2000 provided on the rear, a subject distance measuring device 3000, and a flash module 4000. The subject distance measuring device 3000 may comprise one of the packages of a surface light emitting laser device as a light emitting unit. The subject distance measuring device 3000 may comprise an auto focus function using a laser. The subject distance measuring device 3000 may measure the distance between the subject and the camera devices 1000 and 2000 using a laser. The distance to a subject measured by the subject distance measuring device 3000 may be used for AF driving control of the camera devices 1000 and 2000. The subject distance measuring device 3000 may be mainly used in a condition in which an auto focus function using images of the camera devices 1000 and 2000 is deteriorated, for example, in close proximity of 10 m or less or in a dark environment. The subject distance measuring device 3000 may comprise a light emitting unit comprising a vertical cavity surface emitting laser (VCSEL) semiconductor device and a light receiving unit such as a photodiode that converts light energy into electrical energy. The subject distance measuring device 3000 may measure the distance to a subject by calculating the time for light emitted from the light emitting unit to be reflected by the subject and incident to the light receiving unit. The flash module 4000 may comprise a light emitting element for emitting a light therein. The flash module 4000 may be operated by operating a camera of an optical instrument or by a user's control.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:
- a first housing;
- a first mover disposed in the first housing, the first mover including a first surface and a second surface perpendicular to the first surface;
- a first magnet and a first coil configured to tilt the first mover about a first axis;
- a second magnet and a second coil configured to tilt the first mover about a second axis perpendicular to the first axis;
- a first yoke disposed on the first surface of the first mover; and
- a second yoke disposed on the second surface of the first mover,
- wherein the first yoke is disposed between the second magnet and the first mover,
- wherein the second yoke is disposed between the first magnet and the first mover,
- wherein the first yoke is disposed to be perpendicular to the first axis,
- wherein the second yoke is disposed to be perpendicular to the second axis,
- wherein the first mover comprises a reflective member,
- wherein the first yoke and the second yoke are configured to tilt together with the reflective member,
- wherein the first mover comprises a first groove formed on the first surface and a second groove formed on the second surface,
- wherein the first yoke and the second magnet are disposed in the first groove,
- wherein the first magnet is disposed in the second groove,
- wherein at least a portion of the first magnet is open toward the first groove, and
- wherein at least a portion of the first yoke overlaps the first magnet in a direction of a third axis perpendicular to the first axis and the second axis.

2. The camera device of claim 1, comprising a second housing and a second mover disposed in the second housing,
- wherein the first yoke and the second yoke are disposed parallel to a direction in which the second mover moves.

3. The camera device of claim 2, wherein a light is incident along the first axis, and
- wherein the first mover, the first yoke, the second magnet, and the second coil are sequentially disposed along the first axis.

4. The camera device of claim 3, wherein the first yoke has an upper surface or a lower surface perpendicular to the first axis.

5. The camera device of claim 3, comprising a driving plate disposed between the first housing and the first mover.

6. The camera device of claim 5, wherein the second mover is configured to move along the third axis, and
- wherein the driving plate is disposed between the first housing and the first mover in a direction of the third axis.

7. The camera device of claim 3, wherein, in a direction of the second axis, a length of the first yoke is 1.2 to 1.6 times a length of the second magnet.

8. The camera device of claim 3, wherein, in a direction of the second axis, a length of the first yoke is 1.3 to 1.5 times a length of the second magnet.

9. The camera device of claim 3, wherein the light is incident to the reflective member along the first axis.

10. The camera device of claim 9, wherein the reflective member is configured to reflect the light to a lens module coupled to the second mover.

11. The camera device of claim 3, wherein the second yoke comprises two second yokes
- spaced apart from each other, and
- wherein the first yoke connects the two second yokes.

12. The camera device of claim 3, wherein, in a direction of the second axis, a length of the first yoke is greater than a length of the second magnet.

13. The camera device of claim 3, wherein an area of the first yoke is greater than an area of the second magnet.

14. The camera device of claim 3, wherein a length of a long axis of the first yoke is greater than a length of a long axis of the second magnet.

15. The camera device of claim 3, wherein an area of one surface of the first yoke is greater than an area of one surface of the second magnet facing the one surface of the first yoke.

16. The camera device of claim 3, wherein the second yoke comprises two second yokes disposed at an opposite side to each other with respect to the first mover.

17. The camera device of claim 1, wherein the first yoke comprises one surface in contact with the first mover and an other surface opposite to the one surface and in contact with the second magnet, and
- wherein the first yoke and the second yoke are integrally formed.

18. An optical instrument, comprising:
- a main body;
- the camera device of claim 1 disposed on the main body; and
- a display disposed on the main body and configured to output an image photographed by the camera device.

19. A camera device comprising:
- a housing;
- a mover disposed in the housing;
- a first magnet and a first coil configured to tilt the mover about a first axis;
- a second magnet and a second coil configured to tilt the mover about a second axis perpendicular to the first axis;
- a lens module configured to move along a third axis perpendicular to the first axis and the second axis;

a first yoke disposed between the second magnet and the mover; and a second yoke disposed between the first magnet and the mover, wherein a light is incident along the first axis, wherein the first yoke extends in a direction perpendicular to the first axis, wherein the second yoke extends in a direction perpendicular to the second axis, wherein the mover comprises a reflective member, wherein the first yoke and the second yoke are configured to tilt together with the reflective member, wherein the mover comprises a first surface and a second surface perpendicular to the first surface, wherein the mover comprises a first groove formed on the first surface and a second groove formed on the second surface, wherein the first yoke and the second magnet are disposed in the first groove, wherein the first magnet is disposed in the second groove, wherein at least a portion of the first magnet is open toward the first groove, and wherein at least a portion of the first yoke overlaps the first magnet in a direction of the third axis.

20. A camera device comprising:

a housing;

a mover disposed in the housing;

a first magnet and a first coil configured to tilt the mover about a first axis;

a second magnet and a second coil configured to tilt the mover about a second axis perpendicular to the first axis;

a lens module spaced apart from the mover and comprising a lens; and a yoke disposed between the mover and the housing, wherein the lens module is configured to move along a third axis perpendicular to the first axis and the second axis, wherein a light is incident along the first axis, wherein the yoke comprises a first yoke disposed between the second magnet and the mover, and a second yoke disposed between the first magnet and the mover, wherein the first yoke extends orthogonally to the first axis, wherein the second yoke extends orthogonally to the second axis, wherein the mover comprises a reflective member, and wherein the first yoke and the second yoke are configured to tilt together with the reflective member, wherein the mover comprises a first surface and a second surface perpendicular to the first surface, wherein the mover comprises a first groove formed on the first surface and a second groove formed on the second surface, wherein the first yoke and the second magnet are disposed in the first groove, wherein the first magnet is disposed in the second groove, wherein at least a portion of the first magnet is open toward the first groove, and wherein at least a portion of the first yoke overlaps the first magnet in a direction of the third axis.

* * * * *